US007832716B2

(12) United States Patent
Wakabayashi et al.

(10) Patent No.: US 7,832,716 B2
(45) Date of Patent: Nov. 16, 2010

(54) SHEET PROCESSING APPARATUS AND IMAGE FORMING SYSTEM

(75) Inventors: Hiroyuki Wakabayashi, Hachioji (JP); Masaaki Uchiyama, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/060,316

(22) Filed: Apr. 1, 2008

(65) Prior Publication Data

US 2009/0001648 A1 Jan. 1, 2009

(30) Foreign Application Priority Data

Jun. 28, 2007 (JP) ............................ 2007-170246

(51) Int. Cl.
*B41L 43/00* (2006.01)
*B41L 43/12* (2006.01)
*B65G 33/04* (2006.01)
*B65G 39/00* (2006.01)

(52) U.S. Cl. ........................ 270/37; 270/32; 270/58.07; 270/58.08; 270/58.11; 270/58.12; 270/58.17; 270/58.27

(58) Field of Classification Search .................. 270/32, 270/37, 58.07, 58.08, 58.11, 58.12, 58.17, 270/58.27
See application file for complete search history.

(56) References Cited

U.S. PATENT DOCUMENTS

| | | | | |
|---|---|---|---|---|
| 4,080,678 | A * | 3/1978 | Muller | 412/13 |
| 7,285,084 | B2 * | 10/2007 | Fujimoto et al. | 493/442 |
| 2005/0147487 | A1 * | 7/2005 | Wakabayashi et al. | 412/9 |
| 2006/0208411 | A1 * | 9/2006 | Saito et al. | 270/58.07 |
| 2007/0161489 | A1 * | 7/2007 | Ikeda et al. | 493/444 |
| 2008/0211158 | A1 * | 9/2008 | Fukasawa et al. | 270/1.01 |

FOREIGN PATENT DOCUMENTS

JP 2005-306559 A 11/2005

* cited by examiner

*Primary Examiner*—Gene Crawford
*Assistant Examiner*—Yolanda Cumbess
(74) *Attorney, Agent, or Firm*—Holtz, Holtz, Goodman & Chick, PC

(57) ABSTRACT

A sheet processing apparatus including: a sheet supporting table that supports a sheet stack made of a plurality of sheets which have been folded; a stopper against which a first edge of the sheet stack which is a side to be cut of the sheet stack is pressed on the sheet supporting table; and a pushing member which pushes a second edge of the sheet stack so that the first edge is pressed against the stopper, wherein the pushing member comprises a first surface that is inclined with respect to a sheet supporting surface of the sheet supporting table so that the first surface restricts a height of the folded part of the sheet stack with respect to the sheet supporting surface when the pushing member presses the sheet stack towards the stopper.

9 Claims, 23 Drawing Sheets

SHEET PROCESSING APPARATUS AND IMAGE FORMING SYSTEM

RELATED APPLICATION

This application is based on Japanese Patent Application No. 2007-170246 filed on Jun. 28, 2007 in Japan Patent Office, the entire content of which is hereby incorporated by reference.

TECHNICAL FIELD

The present invention relates to a sheet processing apparatus that collects together a plurality of sheets after carrying out center folding of sheets and to an image forming systems provided with such a sheet processing apparatus, and in particular, to a sheet processing apparatus that carries out processes such as stapling, cutting, etc., on sheets that have been folded.

BACKGROUND

Conventionally, sheet processing apparatuses have been put into practice that are provided with a cutting section that cuts the edges of a sheet stack and aligns the edges of a sheet stack that has been center folded.

In recent years, sheet processing apparatuses are being provided that have a cutting section, receive sheets on which images have been formed by an image forming apparatus such as a copying machine, printer, etc., carry out center stapling and center folding, and after binding a bound book like a weekly magazine, cut and align the edges of the sheet stack using the cutting section.

In the Unexamined Japanese Patent Application Publication No. 2005-306559, a sheet processing apparatus is disclosed in which a sheet stack prepared by center stapling and center folding is conveyed, the sheet stack is made to press against a stopper to correct skews in the sheet stack, and then the front edge of the sheet stack is cut by a cutting section.

In the sheet processing apparatus of the Unexamined Japanese Patent Application Publication No. 2005-306559, after correcting skews of the sheet stack, by applying pressure to it in the thickness direction the sheet stack is restricted its orientation and shaped, and then the sheet stack is cut.

However, in the orientation restriction and shaping process as in the Unexamined Japanese Patent Application Publication No. 2005-306559, if there are curls in the sheets, there was the problem that the sheet stack may not be shaped sufficiently and the edge of the sheet stack after cutting could not be finished to be flat sometimes.

In particular, in the shaping process of pressing the sheet stack, it became clear that sometimes it is not possible to remove the twisting of the sheet stack and therefore the quality of a booklet made from the sheet stack was reduced.

Further, regarding the problem, detailed explanations are given in the explanations of the preferred embodiments of the present invention.

One aspect of the present invention is a sheet processing apparatus comprising:

a sheet supporting table which supports a sheet stack made of a plurality of sheets which have been folded;

a stopper against which a first edge of the sheet stack which is a side to be cut of the sheet stack is pressed on the sheet supporting table; and a pushing member which pushes a second edge of the sheet stack which is a side of a folded part of the sheet stack so that the first edge of the sheet stack is pressed against the stopper, wherein the pushing member comprises a first surface which is inclined with respect to a sheet supporting surface of the sheet supporting table so that the first surface restricts a height of the folded part of the sheet stack with respect to the sheet supporting surface when the pushing member presses the sheet stack towards the stopper.

In addition, an image forming system comprising:

an image forming apparatus which forms an image onto a sheet; and the above-mentioned sheet processing apparatus which performs a finishing process to the sheet onto which the image has been formed by the image forming apparatus.

DESCRIPTION OF THE PREFERRED EMBODIMENT

Although the present invention is described here based on some preferred embodiments, the present invention shall not be limited to these preferred embodiments.

Figure 1:
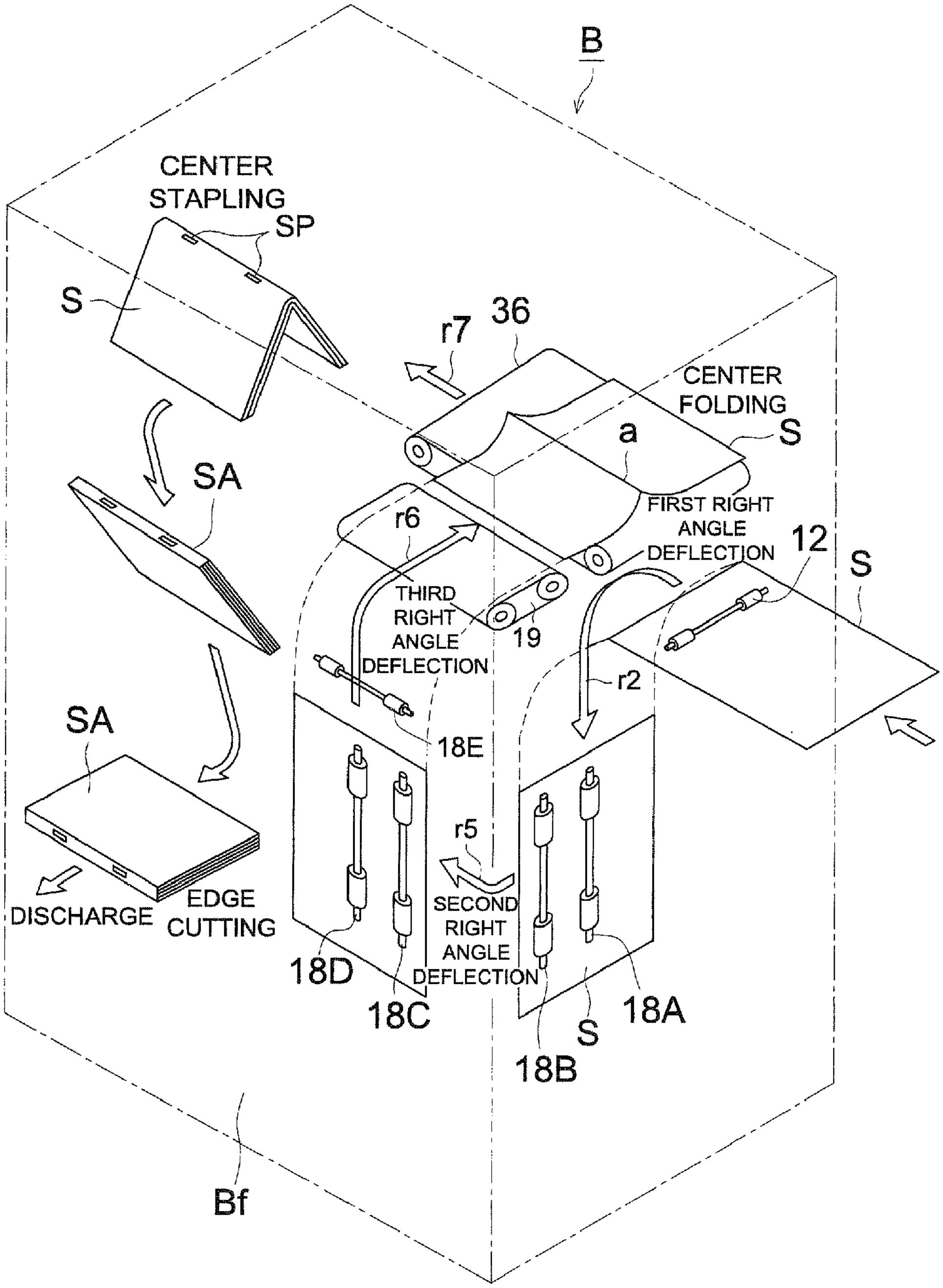
FIG. 1 is a schematic diagram showing the conveying of sheets in the center folding and center stapling processes of a sheet processing apparatus.
Figure 2:
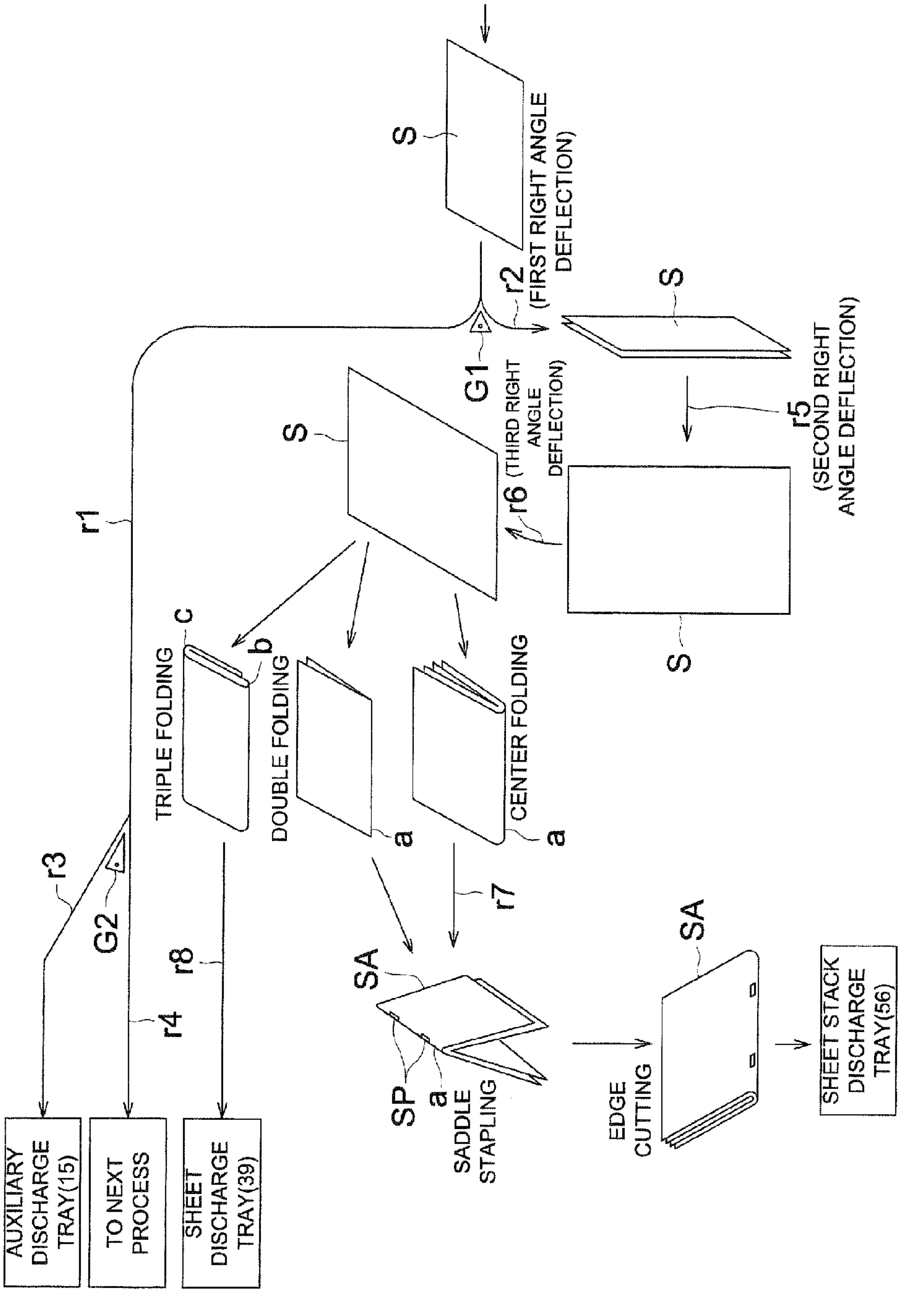
FIG. 2 is a schematic diagram showing the sheet conveying process of a sheet processing apparatus.
Figure 3:
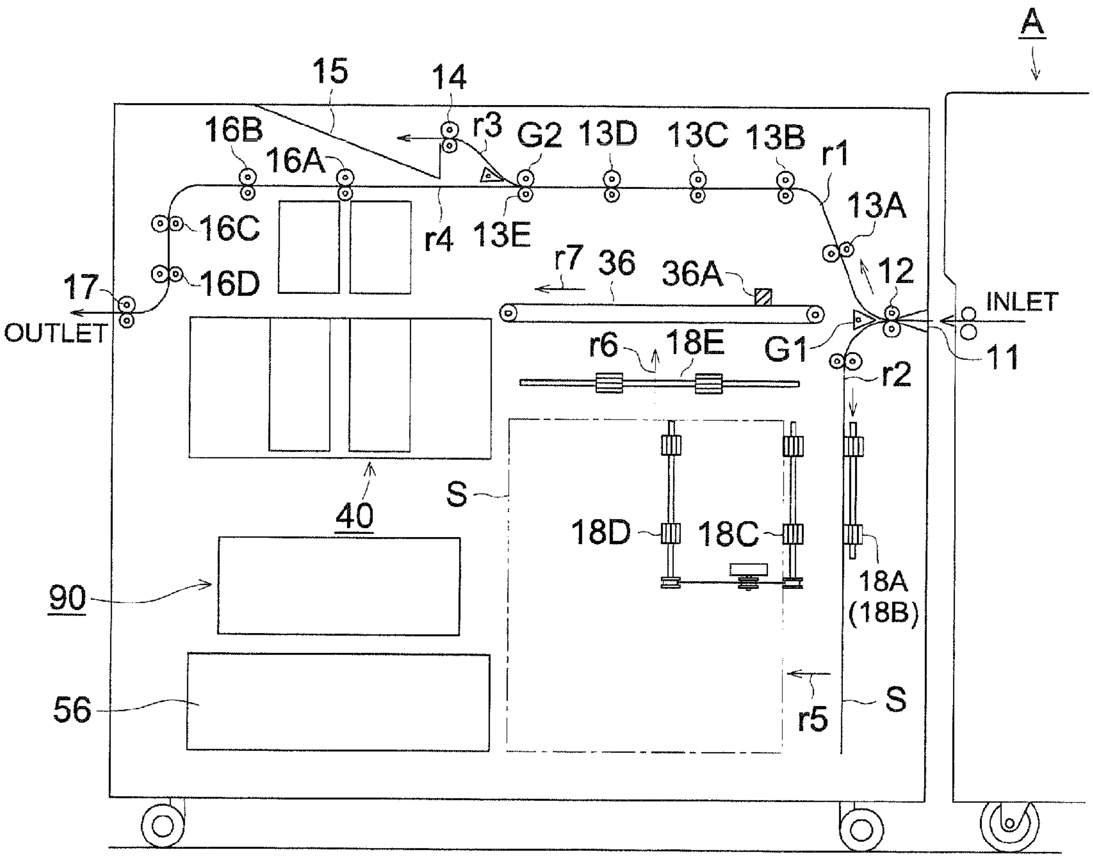
FIG. 3 is the front view diagram of a sheet processing apparatus.
Figure 4:
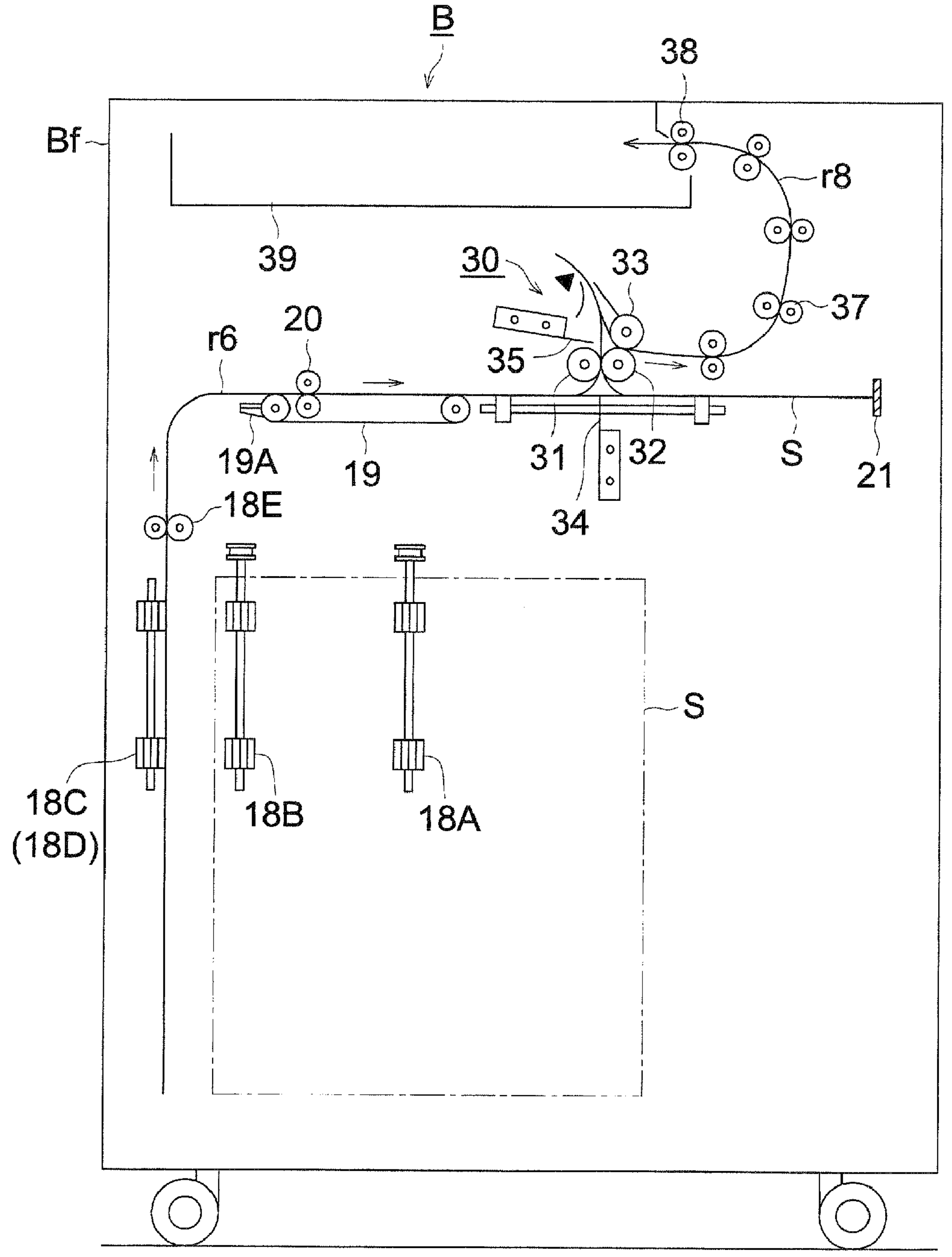
FIG. 4 is a right side view diagram of a sheet processing apparatus.
Figure 5:
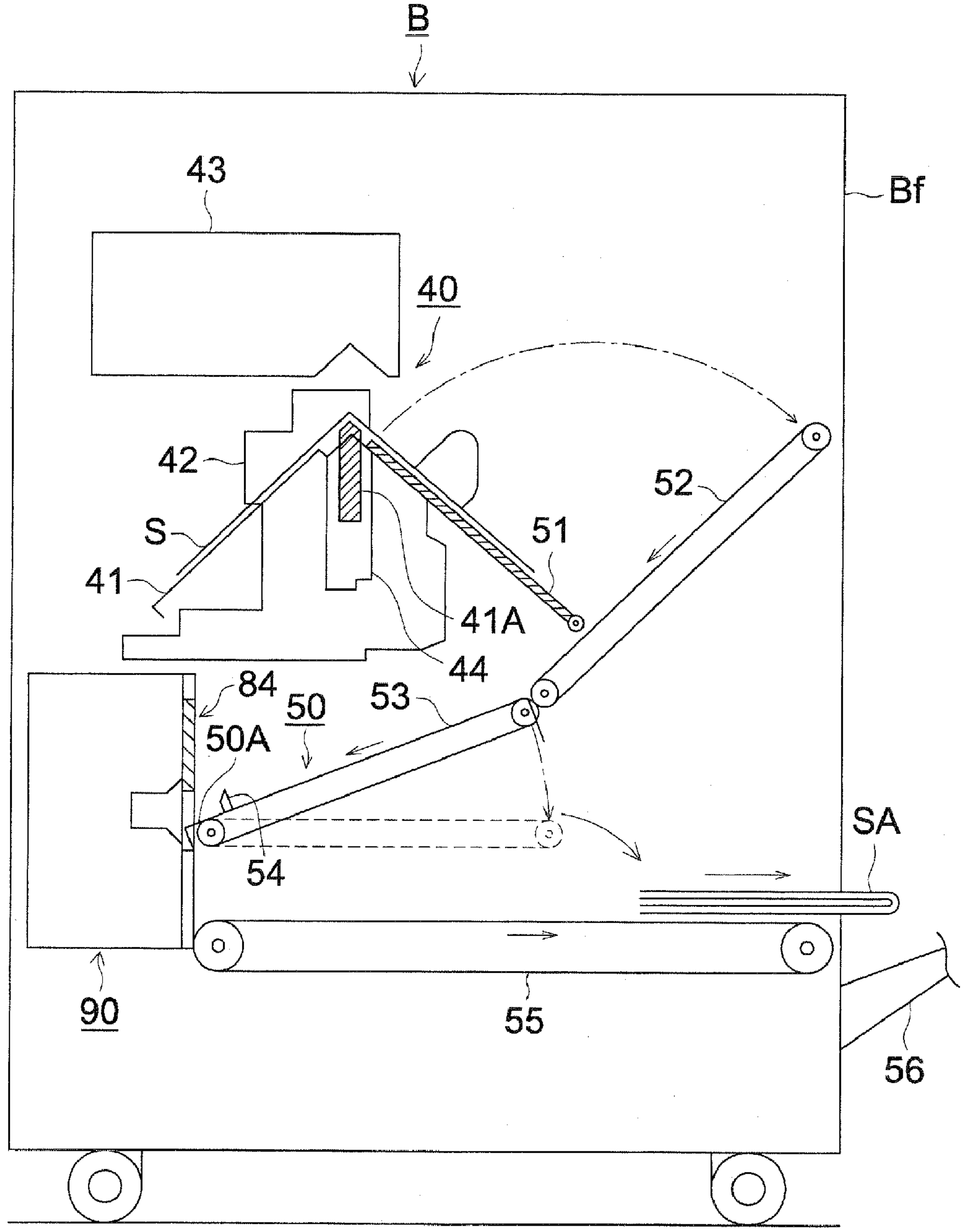
FIG. 5 is a left side view of diagram of a sheet processing apparatus.

Sheet processing Apparatus:

FIG. 1 shows a finishing apparatus which is a sheet processing apparatus according to a preferred embodiment of the present invention, and is a schematic diagram showing the conveying of sheets in the processing steps of a sheet processing apparatus that receives sheets on which images have been formed in an image forming apparatus which is not shown in the Fig. and carries out center folding and center stapling operations on the sheets, FIG. 2 is a schematic diagram showing the sheet conveying process of a sheet processing apparatus, FIG. 3 is a front view diagram of a sheet processing apparatus, FIG. 4 is a right side view diagram of it, and FIG. 5 is a left side view of diagram of it.

Although electro-photographic image forming apparatuses that form images on sheets by charging, exposing, developing, and transferring are used desirable as image forming apparatuses that form images on sheets, conventionally known image forming apparatuses such as inkjet image forming apparatuses, thermal image forming apparatuses, etc., are also being used.

To begin with, the sheet conveying process from inletting the sheets up to just before the sheet folding process is described here.

A sheet processing apparatus is an apparatus that carries out finishing operations on sheets discharged from an image forming apparatus (not shown in the figure), when a sheet S discharged from the image forming apparatus is guided to the inlet section 11 of the sheet processing apparatus, it is gripped by the inlet rollers 12 and is conveyed to either one of the conveying path r1 in the top part or the conveying path r2 in the bottom part of the conveying path selection section G1.

Straight Sheet Discharge:

The sheet S diverted to the conveying path r1 is gripped and conveyed by the conveying rollers 13A to 13E, and is conveyed to either one of the conveying path r3 in the top part or the conveying path r4 in the bottom part of the conveying path selection section G2.

The sheet S that proceeded to the conveying path r3 of the top part is discharged by the sheet discharge roller 14, and is stacked on the auxiliary sheet discharge tray 15 placed on the top part of the sheet processing apparatus B.

The sheet S that proceeded to the conveying path r4 of the bottom part is gripped and conveyed discharged by the conveying rollers 16A to 16D, and is discharged by the sheet discharge roller 17.

First Right Angle Deflecting Conveying:

The sheet S that is conveyed to the conveying path r2 of the bottom part of the conveying path selection section G1 is lowered almost vertically, and is stopped and stored temporarily at a prescribed position. At this stopping position, a plurality of succeeding sheet S is stored one on top of the other.

Second Right Angle Deflecting Conveying:

The stored sheet S is moved in a direction changing manner in a direction at right angles to and in front of the surface of the sheet in FIG. 2 by the conveying rollers 18A to 18D and guide plates which is not shown in the figure, passed through the conveying path r5 that goes around the front side Bf of the interior of the sheet processing apparatus B in a standing up condition, and is stopped temporarily at a prescribed position.

Third Right Angle Deflecting Conveying:

Next, after the sheet S has been conveyed in the vertically upward direction by the conveying rollers 18E, it is deflected in the horizontal direction, and is moved towards the aligning section by the conveying alignment belt 19 and the conveying rollers 20 (conveying path r6).

Alignment Before Folding Process:

An aligning section is placed on the downstream side of the conveying path r6 in the sheet conveying direction, and has an aligning member 21 that aligns by making the front edge of the sheets come in to contact with it and a movable aligning member 19A that pushes against and moves the rear edge of the sheet S. The aligning member 19A presses the rear edge of the sheet S conveyed by the conveying roller 20 placed on the upstream side in the sheet conveying direction of the conveying path r6 and moves it up to the aligning member 21 and aligns the sheets by making the front edges of the sheets S come into contact with the aligning member 21.

Next, the center folding process, center stapling process, and process of cutting the edges of the sheet stack in the sheet processing apparatus are explained in concrete terms.

Center Folding Mechanism:

A folding section 30 has been placed on the downstream side of the conveying alignment belt 19 in the sheet conveying direction. The folding section 30 has the folding rollers 31, 32, and 33, a first folding plate 34, and a second folding plate 35.

Double Folding Process:

The one or a plurality of sheets S arriving at the folding section 30 are double folded by being gripped by the folding rollers 31 and 32 rotating in mutually opposite directions and the first folding plate 34 moving forward, thereby forming a folding crease a (see FIG. 2) over the entire breadth direction of the sheet at the middle in the sheet conveying direction (see FIG. 4). The sheet S that has been double folded passes through the conveying path of center folding described later and is discharged to the sheet discharge tray 56.

Triple Folding Process:

When carrying out triple folding, in the folding section 30, after a first folding crease b is formed in the sheet S by the folding rollers 31 and 32 and a first folding plate member 34, and a second folding crease c is formed by the folding rollers 32 and 33 and a second folding plate member 35 and the triple folding operation is completed, it is passed through the conveying path r8 make of a plurality of conveying rollers 37 and guide plates, it is discharged to the sheet discharged tray 39 by the sheet discharge roller 38.

Center Folding Process:

A sheet S to which double folding operation has been made and the folding crease a has been formed by the folding rollers 31 and 32 and the first folding plate member 34 is separated from the nipping position of the folding rollers 31 and 32 and is returned to the horizontal conveying path by the reverse rotations of the folding rollers 31 and 32. Next, the sheet S is conveyed further to the conveying path r7 in the direction of extension of the folding crease a (see FIG. 1 and FIG. 2) by the conveying tab 36A (see FIG. 3) fixed to the rotating conveying belt 36, and is sent to the stapling section 40.

In this manner, because the folding section 30 carries out folding operation on a small number of sheets S from 1 to 3 sheets, firmly puts the folding crease a, and successively conveys the sheets to the stapling section 40, it is possible to prepare a sheet stack SA (binding item) with small bulging of the folding crease a and a high quality.

Center Stapling Process:

The sheets S center folded in the folding section 30 proceed in the direction of the conveying path r7 by the conveying belt 36 and guiding section not shown in the figure, and are stacked on top of a saddle shaped collection member 41. Even the succeeding center folded sheets S successively pass through the conveying path r7 and are stacked on top of the saddle shaped collection member 41.

The saddle shaped collection member 41 is made of two guide plates that are at an almost right angle with each other, and has been fixed to the body of the apparatus. Near the apex part of the saddle shaped collection member 41 is placed a pressing member 41A which is provided with springs and which can be raised or lowered and is supported by a staple receptacle mechanism 44 (see FIG. 5).

The apex part of the pressing member 41A has the shape of an almost right-angled projection, the folding crease a of the center-folded sheet S is placed on the ridge of that apex part (see FIG. 2).

The plural sheets of paper S placed on top of the saddle shaped collection member 41 and pressing member 41A have their position aligned by the width alignment section 42.

A stapling mechanism 43 is placed in a fixed position above the pressing member 41A. Inside the saddle shaped collection member 41 are supported the pressing member 41A and the staple receptacle mechanism 44 so that they can move in the up/down direction.

Two sets of the stapling section with a dual section structure made of a stapling mechanism 43 and a staple receptacle mechanism 43 are placed along the direction of the folding crease. When the center stapling process is selected in the console section, the staple receptacle mechanism 44 rises thereby carrying out center stapling. In other words, the two sets of stapling sections affix the staples SP at two locations equidistant from the center along the folding crease a of the sheet stack SA on the pressing member 41A (see FIG. 1). A center-folded and center-stapled sheet stack SA is shown schematically in FIG. 1.

Sheet Stack Cutting Process:

The sheet stack SA that has been center stapled in the center-stapling section 40 is supported by the guiding member 51 of the sheet stack conveying section 50, swung in the direction indicated by the dot and dash line, and is placed on the conveying belt 52. The sheet stack SA is conveyed in an inclined downward direction due to the rotation of the conveying belt 52, is held in the inclined state and conveyed by the rotating conveying belt 53, and stops at a prescribed position.

Thereafter, the conveying belt 53 swings and goes into the horizontal state. Since the edges (the free end part on the opposite side of the folding crease) of the sheet stack SA placed on this conveying belt 53 which has gone into the horizontal state will have unevenness depending on the number of sheets of paper in the sheet stack SA, the edges are aligned by cutting using a cutting device 90.

The sheet stack SA prepared by cutting is placed on the conveying belt 53 which is rotating in the reverse direction, conveyed in a state in which the rear edge of the sheet stack SA is pressed by the movable aligning member 54 fixed to the conveying belt 53, and is dropped in the direction of the arrow from the front end of the conveying belt 53. The dropped sheet stack SA is discharged by the rotating discharge belt 55 to the discharge tray 56 placed outside the front side Bf of the sheet processing apparatus B.

Edge-Cutting Process:

Next, the details of the mechanisms of the cutting device 90 and of the sheet stack conveying driving section are described below.

Figure 6:
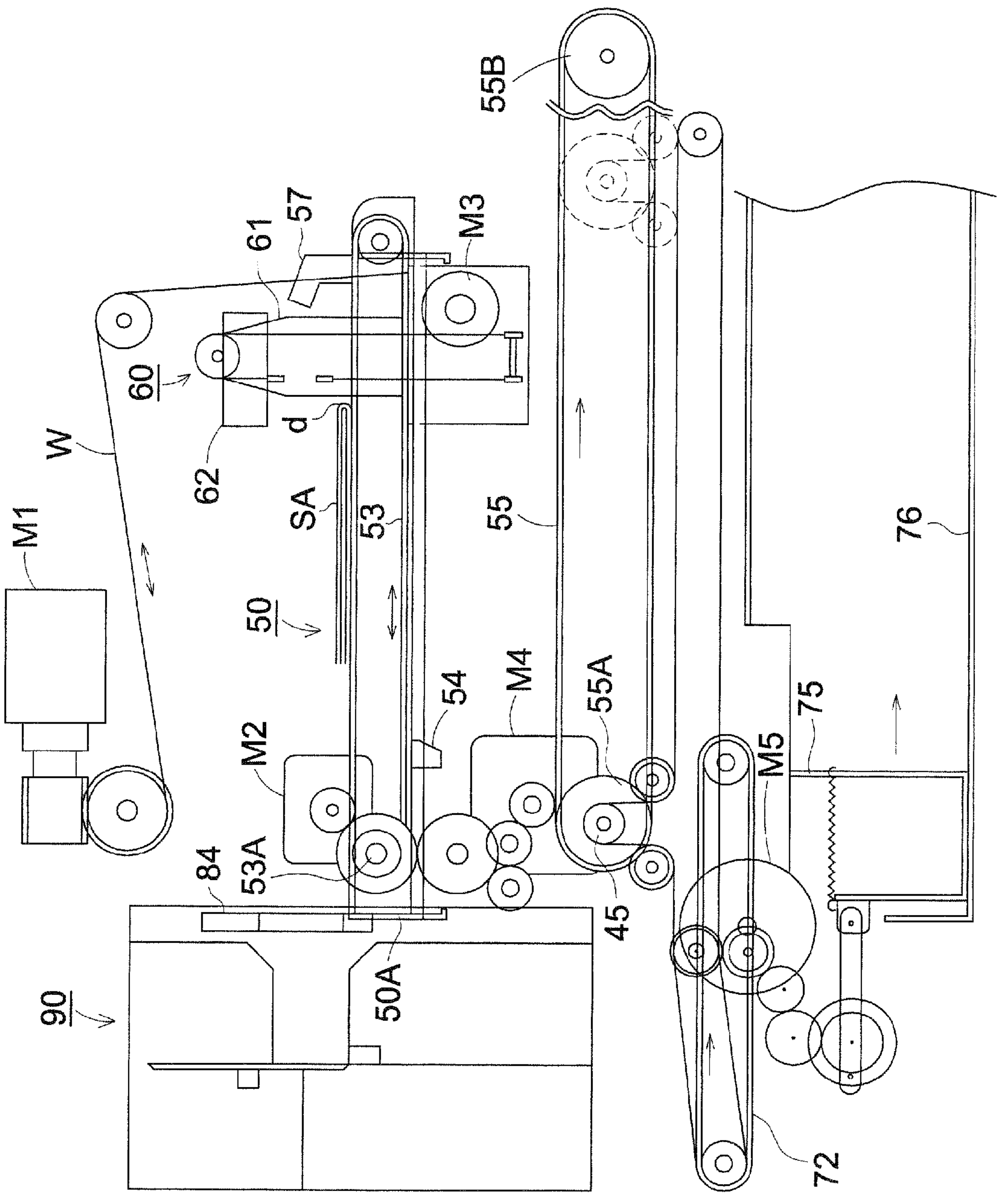
FIG. 6 is an overall view diagram of a sheet stack conveying driving mechanism.

Sheet Stack Conveying Driving Mechanism:

FIG. 6 is an overall view diagram of a sheet stack conveying driving mechanism.

The motor M1 swings the conveying belt 53 via a wire W centering on the drive roller rotating shaft 53A. The motor M2 rotates in the forward direction the conveying belt 53 which has an integral structure with the movable aligning member 54. The motor M3 raises or lowers the pressure member 62 that presses the neighborhood of the folding crease d of the sheet stack SA. The motor M4 conveys linearly, in the sheet stack conveying direction, the moving member 61 of the sheet stack gripping and moving section 60 (details are described with FIG. 8). The motor M5 carries out rotation of the discharge belt 55 that passes round the drive roller 55A and the auxiliary roller 55B, rotation of the cutting waste conveying belt 72, and the movement of the transfer member 75 of the cutting waste collection box 76.

Figure 7:
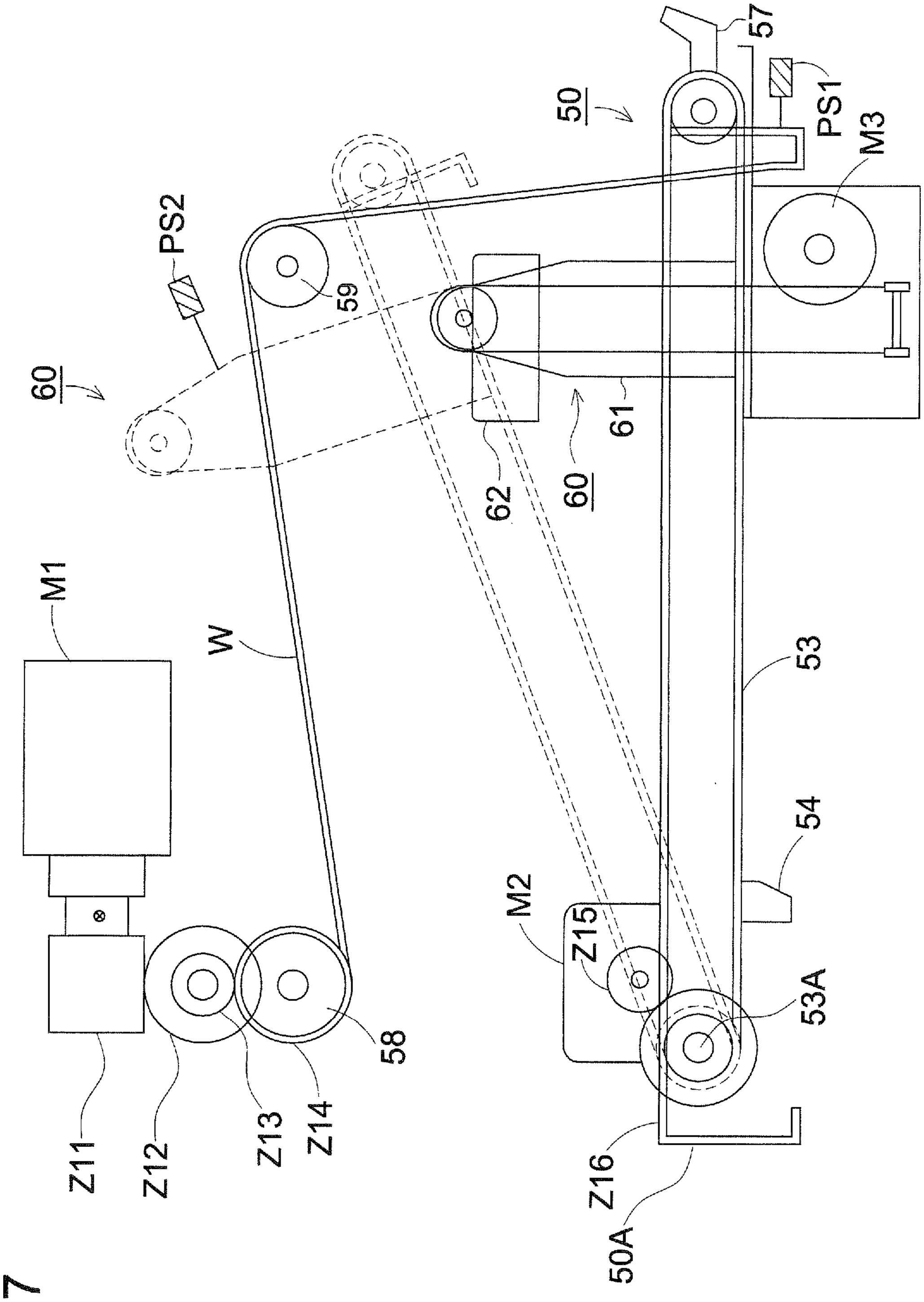
FIG. 7 is a cross-sectional view diagram of a swinging mechanism that causes swinging movement of the sheet stack conveying section and of the conveying belt.

FIG. 7 is a cross-sectional view diagram of a swinging mechanism that causes swinging movement of the sheet stack conveying section 50.

The conveying belt 53 of the sheet stack conveying section 50 is supported so as to freely swing about the drive roller rotating shaft 53A. The wire W whose one end is connected to the end part (right side of the figure) of the sheet stack conveying section 50, is passed over the outer surface of the intermediate roller 59, which is supported in a rotatable manner by the main unit of the apparatus, has its direction changed, is passed around the outer surface of the pulley 58, and the end of the wire is connected to a part of the pulley 58.

The gear Z14 fixed on the rotating shaft of the pulley 58 is coupled via intermediate gears Z13 and Z12 to the gear Z11 which is fixed to the drive shaft of the motor M1.

The pulley 58 rotates by the drive from the motor M1, winds up the wire W, pulls up the sheet stack conveying section 50 which is made of a conveying section frame 50A, a conveying belt 53, etc., raises it by swinging upward around the drive roller rotating shaft 53A. The raised position of the sheet stack conveying section 50 is shown by broken lines. PS1 is a sensor detecting the lower limit position of the sheet stack conveying section 50 and PS2 is a sensor detecting the upper limit position of the sheet stack conveying section 50.

When lowering the sheet stack conveying section 50 to the horizontal position, the motor M1 is driven in the reverse direction, the pulley 58 is rotated in the reverse direction, and the tension force of the wire W is released, whereupon the sheet stack conveying section 50 goes down because of its own weight.

The motor M2 rotates the drive roller rotating shaft 53A via the gears Z15 and Z16, and rotates the conveying belt 53 in the forward and reverse directions.

Figure 8:
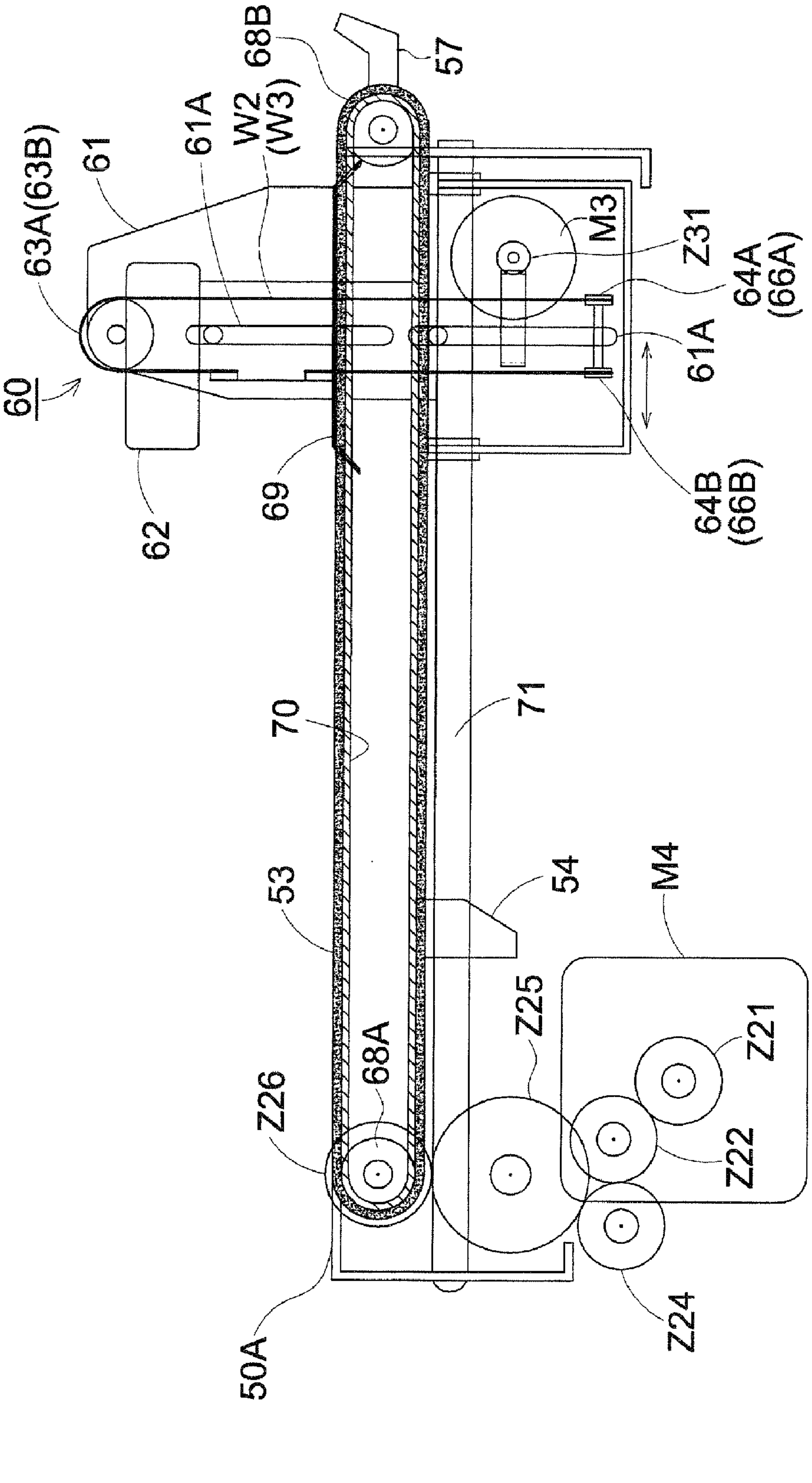
FIG. 8 is a cross-sectional view diagram of a section that restricts the orientation of a sheet stack.

Up/Down Driving Section of the Pressing Plate:

FIG. 8 is a cross-sectional view diagram of the sheet stack gripping and moving section 60 and a section that restricts the orientation of a sheet stack.

The sheet stack gripping and moving section 60 has a moving member 61, a sheet stack supporting plate 69 as a sheet supporting table fixed to the moving member 61, a pressing member 62 capable of up/down movement, a moving member driving section, and a pressure plate up/down driving section.

The motor M3 raises or lowers the pressing member 62 that presses in the vicinity of the folding crease d of the sheet stack SA. The pressing member 62 is supported so as to be capable of moving up/down along the long groove part 61A of the moving member 61.

Figure 9:
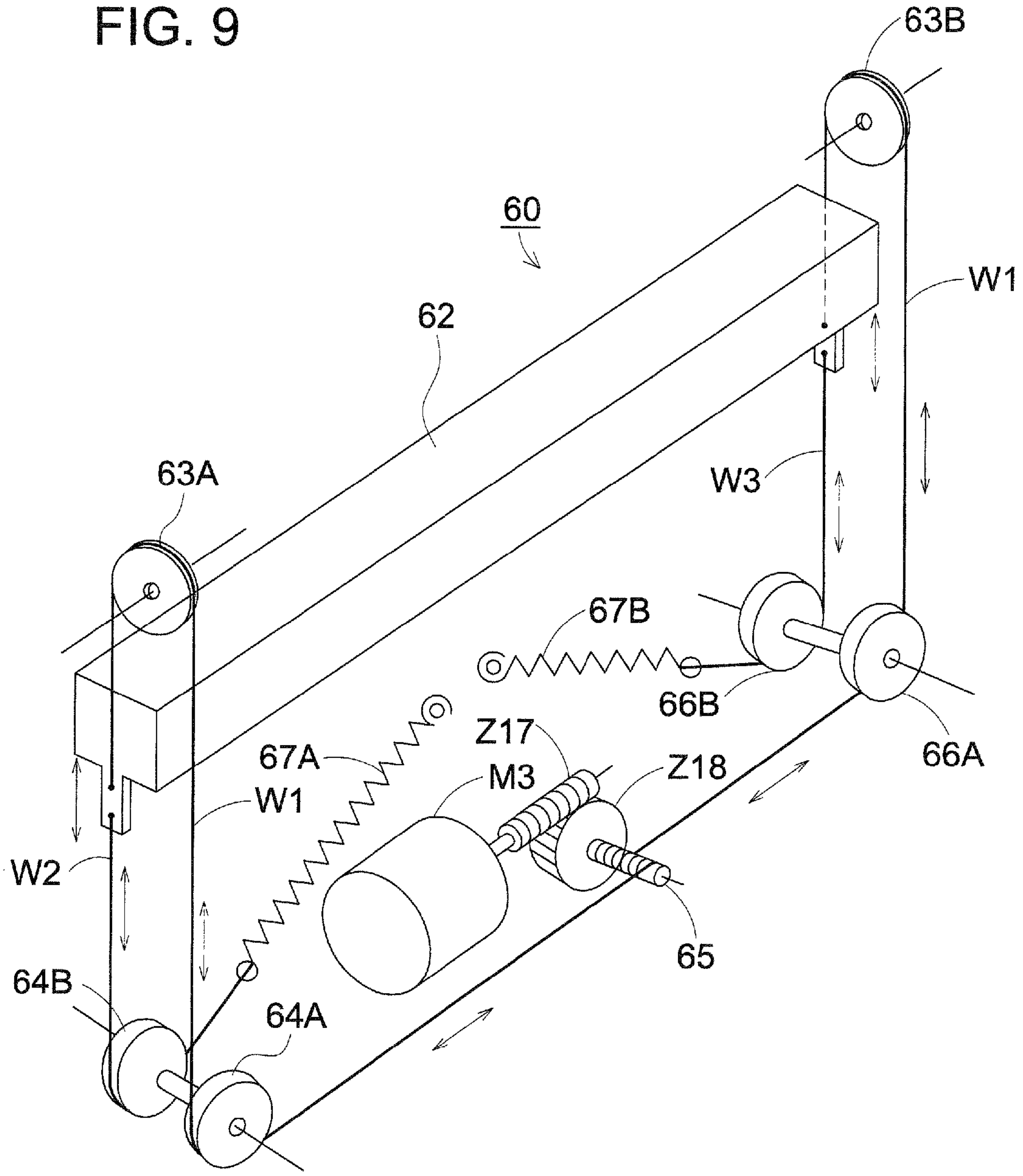
FIG. 9 is a perspective view diagram of a driving mechanism that raises and lowers the pressing member.

FIG. 9 is a perspective view diagram of a driving mechanism that raises and lowers the pressing member 62.

The first wire W1 whose one end is connected to the pressing member 62 is passed around slip-wheel 63A, passed around pulley 64A, and further wound several times on the outer surface of the pulley 65, wound around the pulley 66A, wound around the slip-wheel 63A, and then the other end of wire W1 is fixed to the pressing member 62.

The second wire W2 whose one end is connected to the pressing member 62 is wound around the pulley 64B, and the other end is connected to a spring 67A. The other end of the spring 67A is connected to the main unit of the apparatus.

The third wire W3 whose one end is connected to the pressing member 62 is wound around the pulley 66B and the other end is connected to the spring 67B. The other end of the spring 67B is connected to the main unit of the apparatus.

The forward rotation drive of motor M3 causes forward rotation of the pulley 65 via the gears Z17 and Z11, winding up the wire W1, thereby causing the pressing member 62 to be raised via the slip-wheels 63A and 63B.

Due to the reverse rotation drive of motor M3, the pulley 65 rotates in the reverse direction, the wire W1 gets displaced in the reverse direction, and it becomes possible to lower the pressing member 62 via the slip-wheels 63A and 63B. The wire W2 connected to the pressing member 62 is pulled by the spring 67A thereby lowering the pressing member 62. At the same time, the wire W3 connected to the pressing member 62 is pulled by the spring 67B thereby lowering the pressing member 62. The neighborhood of the folding crease d of the sheet stack SA placed on top of the sheet stack stacking table is pressed due to the lowering of the pressing member 62.

Sheet Stack Gripping and Conveying Section:

In FIG. 8, the motor M4 causes linear movement of the pressing member 62 in the direction of conveying the sheet stack. The driving rotation of the motor M4 causes rotation of drive pulley 68A via the gears Z21, Z22, Z24, Z25 and Z26. The moving member 61 is connected to the belt 70 going around the drive pulley 68A and the auxiliary pulley 68B. The moving member 61 is supported in a sliding manner by the guide bar 71 mounted on the sheet stack placement table 50A in a direction parallel to the direction of conveying the sheet stack. Due to the drive rotation of the motor M4, the belt 70 rotates, and the moving member 61 carries out reciprocating motion along the guide bar 71.

Figure 10:
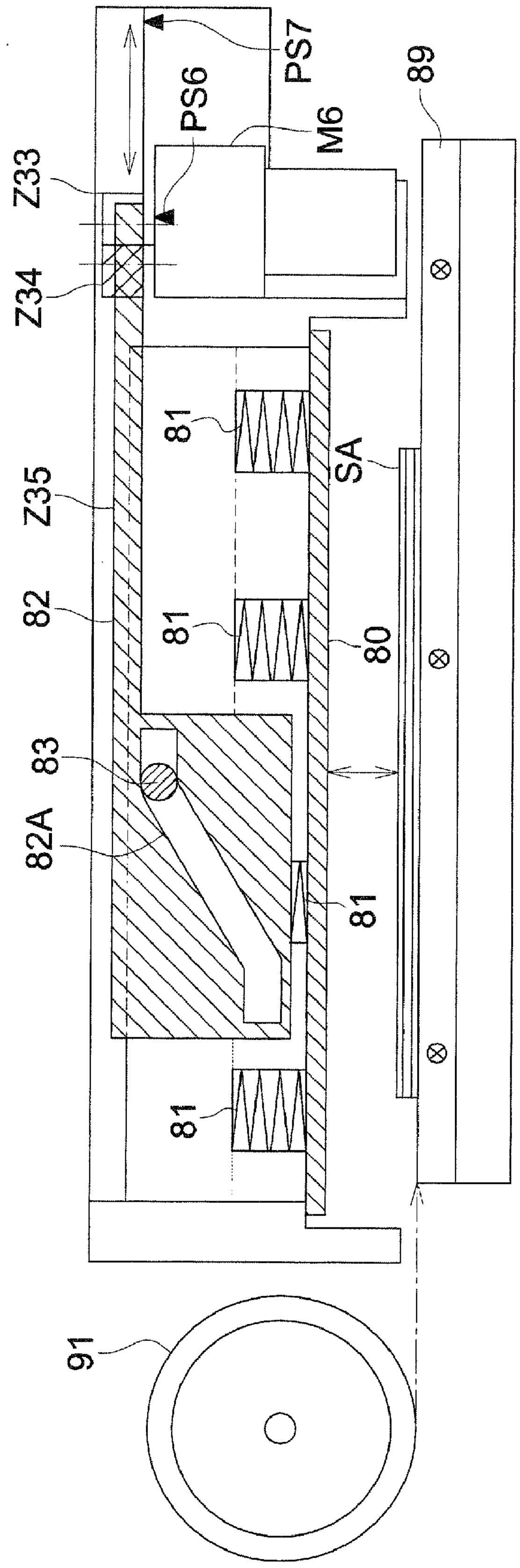
FIG. 10 is a cross-sectional view diagram of the up/down movement of the edge pressing member.

Up/Down Movement of the Edge Pressing Member:

FIG. 10 is a cross-sectional view diagram showing the up/down movement of the edge pressing member 80.

The edge pressing member 80 that presses in the neighborhood of the edge of the sheet stack SA is moved up or down by a cam mechanism and presses against the sheet stack SA due to a pressing spring 81. Differences in the thicknesses of the sheet stacks SA are absorbed by a plural number of pressing springs 81.

The motor M6 rotates the pinion gear Z34 via the gear Z33 thereby causing linear movement of the moving member 82 that has a rack gear Z35 mating with the pinion gear Z34. The roller 83 incorporated in the edge pressing member 80 males in a movable manner with the cam groove section 82A built in the moving member 82.

When the cam groove section 82A pushes down the roller 83 due to the linear movement of the moving member 82, the moving member 82 fixed to the roller 83 moves down by a specific length and pushes the sheet stack SA.

The up/down movement of the edge pressing member 80 is restricted by the length in the vertical direction of the cam groove section 82A of the moving member 82. As a consequence, the up and down movement is controlled by the sensors PS6 and PS7 detecting the length of the linear movement of the moving member 82.

Figure 11:
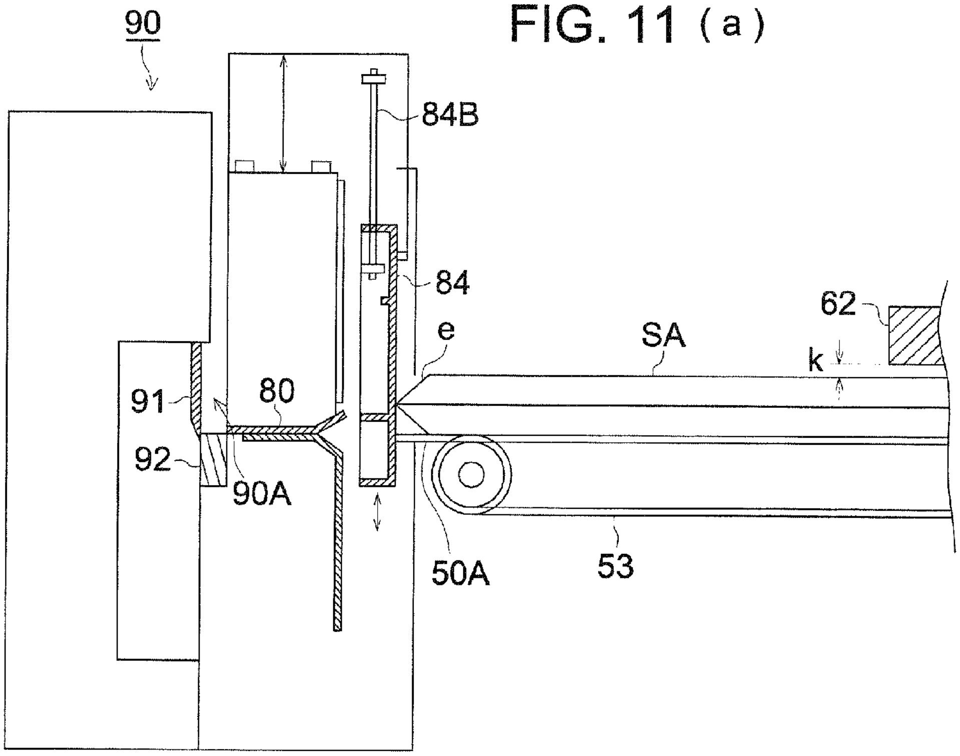
FIGS. 11(*a*) and 11(*b*) are cross-sectional view diagrams in the neighborhood of the cutting section.
Figure 11:
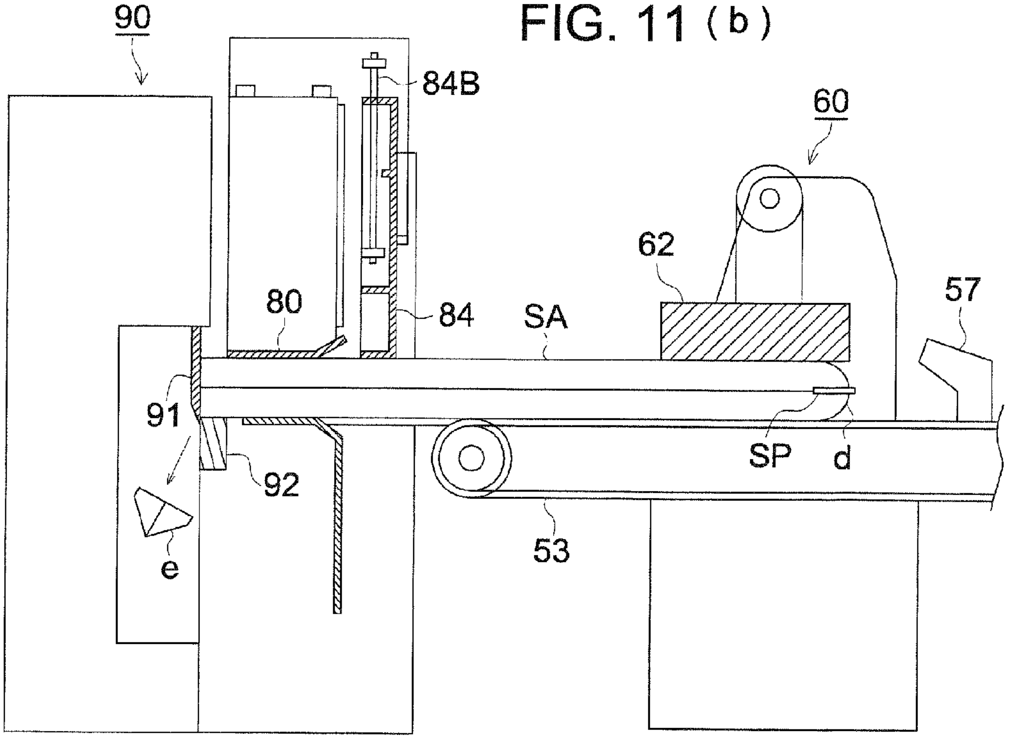
Figure 12:
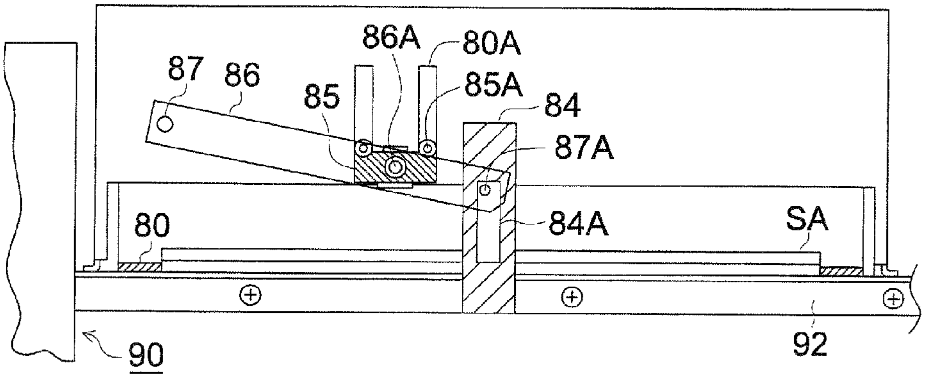
FIGS. 12(*a*), 12(*b*) and 12(*c*) are side view diagrams in the neighborhood of the cutting section.
Figure 12:
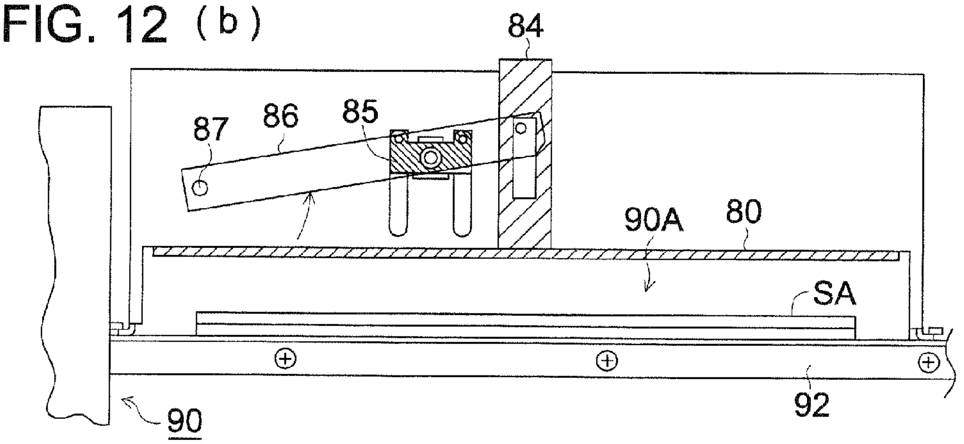
Figure 12:
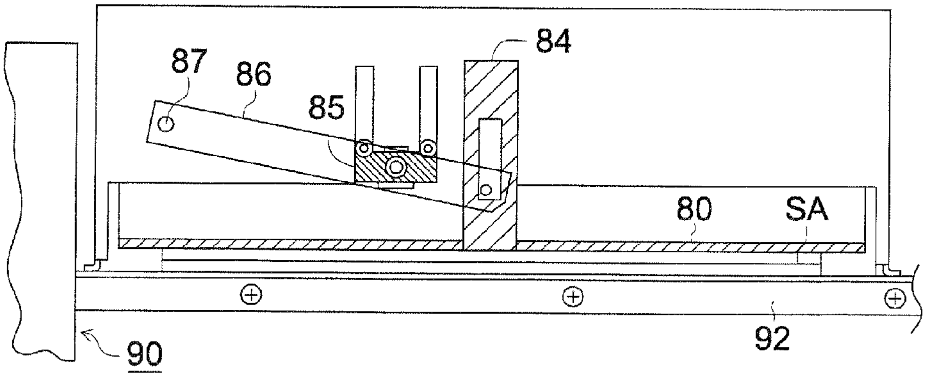

Up/Down Movements of the Stopper and of the Edge Pressing Member:

FIG. 11(*a*) and FIG. 11(*b*) show the cross-sectional view diagrams in the neighborhood of the cutting device 90, and FIG. 12(*a*), FIG. 12(*b*) and FIG. 12(*c*) show the side view diagrams of the cutting device 90.

FIG. 11(*a*) and FIG. 12(*a*) show the state in which the edge e is pressing against the stopper 84, FIG. 12(*b*) shows the state in which the sheet stack SA is conveyed to the opening section 90A of the cutting process, and FIG. 11(*b*) and FIG. 12(*c*) show the condition in which the edge e is cut by the cutting device 90 while pressing in the neighborhood of the edge of the sheet stack SA.

The movable member 85 is supported in a free to swing manner by the edge pressing member 80 that is moved up and down by the motor M6. The roller 85A supported by the movable member 85 moves along the longitudinal groove section 80A incorporated in the edge pressing member 80 thereby moving the movable member 85 in the vertical direction. The movable member 85 is supported so that it can swing in the up and down direction by the shaft 86A built into the lever 86. The base part of the lever 86 is supported in a free to swing manner by the supporting shaft 87. The shaft 87A built into the front end part of the lever 86 moves along the longitudinal groove section 84A of the stopper 84 thereby raising or lowering the stopper 84. The lever 86 can move in the vertical direction along the guide bar 84B (see FIGS. 11(*a*) and 11(*b*).

The single drive source motor M6 not only drives the up and down movement of the edge pressing member 80 but also raises or lowers the stopper 84 via the movable member 85 and lever 86. Since, the distance from the supporting shaft 87 to the front end of the lever 86 is longer than the distance from the supporting shaft 87 to the shaft 86A of the edge pressing member 80, the up/down stroke of the stopper 84 is larger compared to that of the edge pressing member 80.

Although, the stopper 84 is supported so that it can move down either due to its own weight or due to the tension of the spring, the stopper 84 gets lowered along with the lowering of the edge pressing member 80 and stops when the stopper 84 comes into contact with the top surface of the sheet stack SA after the front end of the sheet stack SA has passed.

Restricting the Orientation of the Sheet Stack:

Using FIG. 13 to FIG. 18, the process of conveying a sheet stack SA that has been subjected to center folding and center stapling, carrying out orientation restriction that corrects the skew of the sheet stack, and sending it to the cutting section 90 is explained here.

Figure 13:
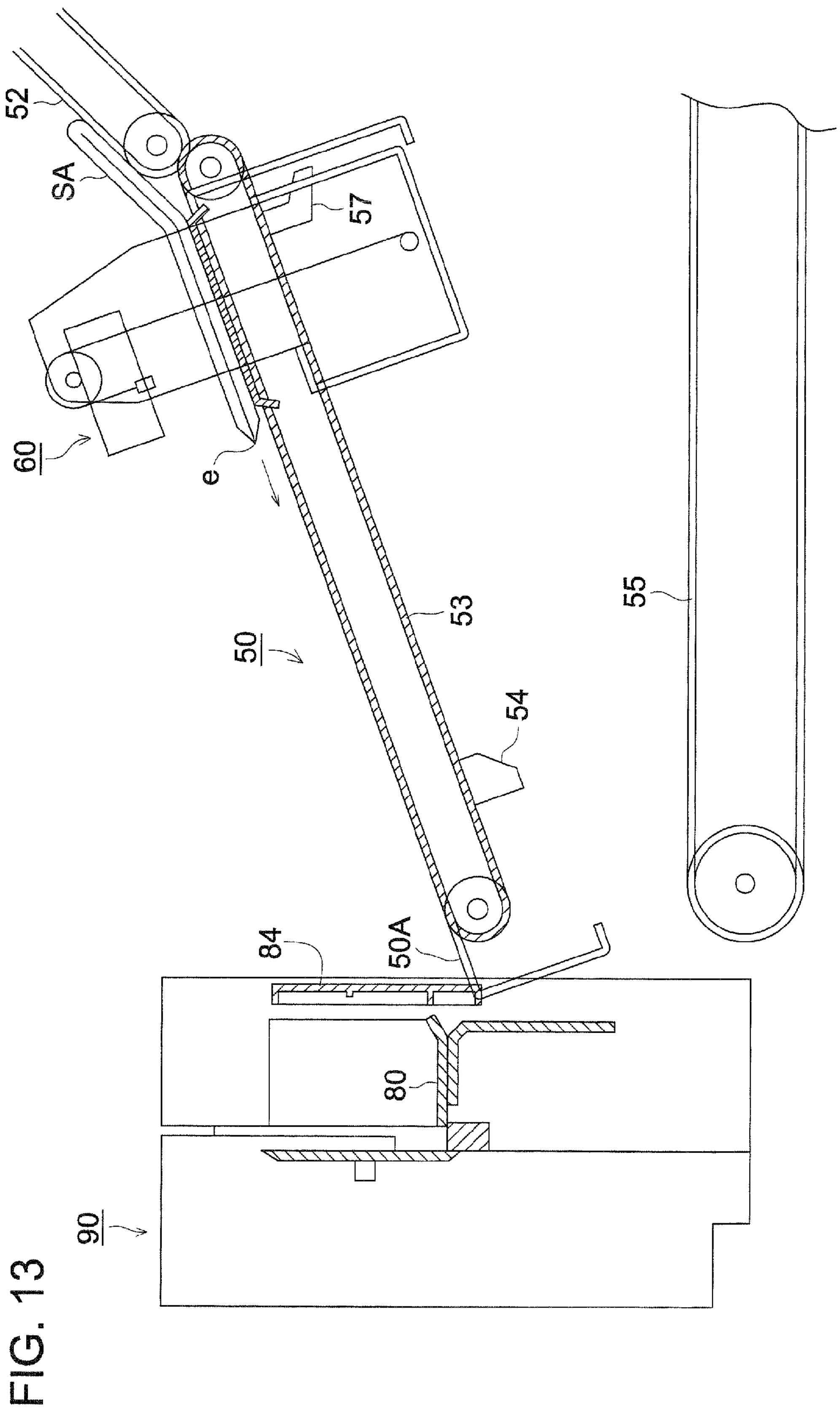
FIG. 13 is a cross-sectional view diagram showing a first preferred embodiment of a process of conveying a sheet stack, correcting its skews, and sending it to the cutting section.

(1) The sheet stack SA that slides and drops on a conveying belt 52 placed in an inclined manner is transported with its edge e being the leading edge on the conveying section frame 50A held in an inclined position (see FIG. 13).

Figure 14:
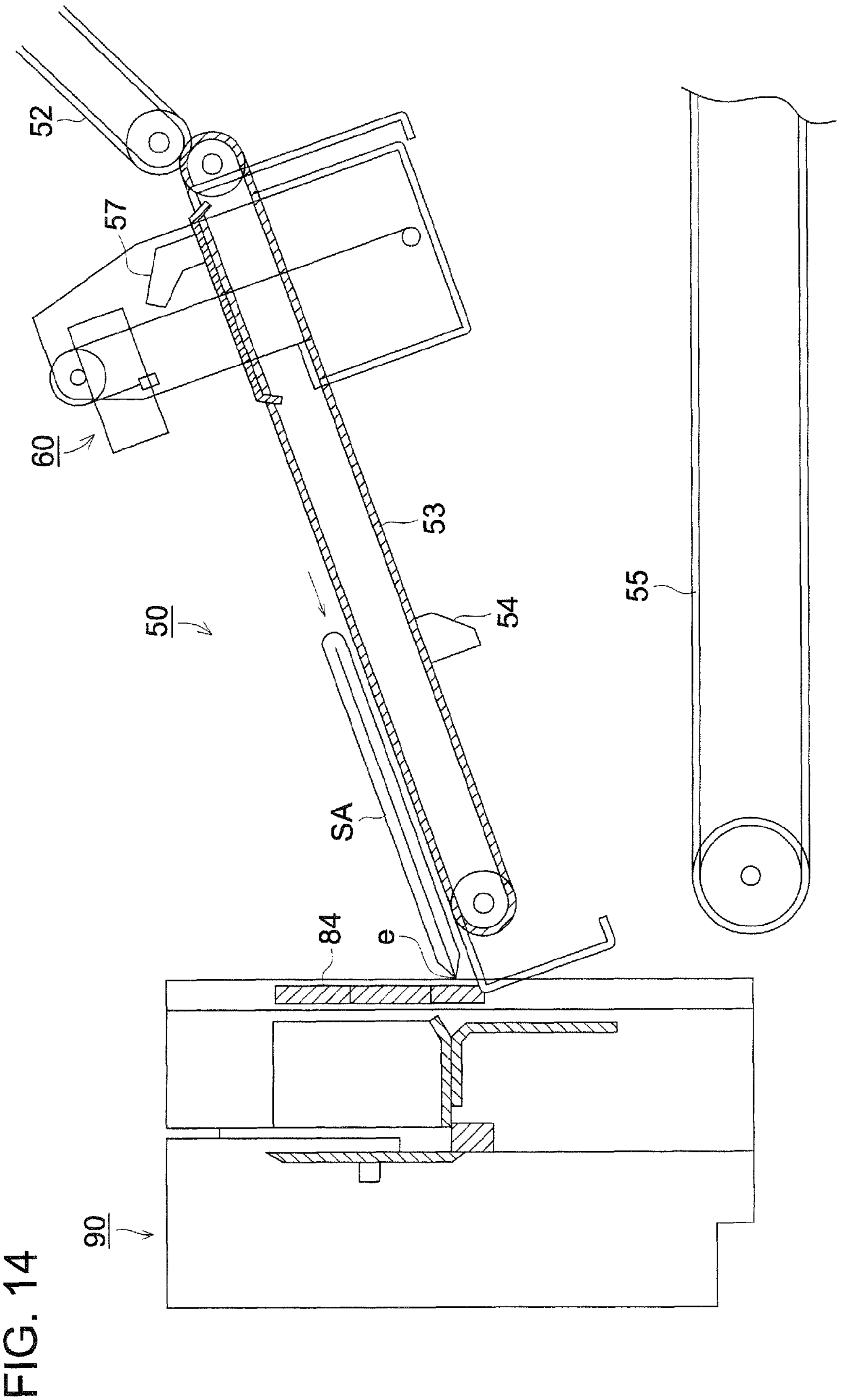
FIG. 14 is a cross-sectional view diagram showing a mechanism that conveys a sheet stack.

(2) The front tip of the edge in the conveying direction of the sheet stack SA sliding and dropping above the conveying section frame 50A stops when it comes into contact with the stopper 84 which is lowered and positioned in the vicinity of the cutting process opening section 90A (see FIG. 14).

(3) By driving the motor M1, conveying section frame 50A and the conveying belt 53 of the sheet stack conveying section 50 are swung to the horizontal state and held there (see FIG. 7).

Figure 15:
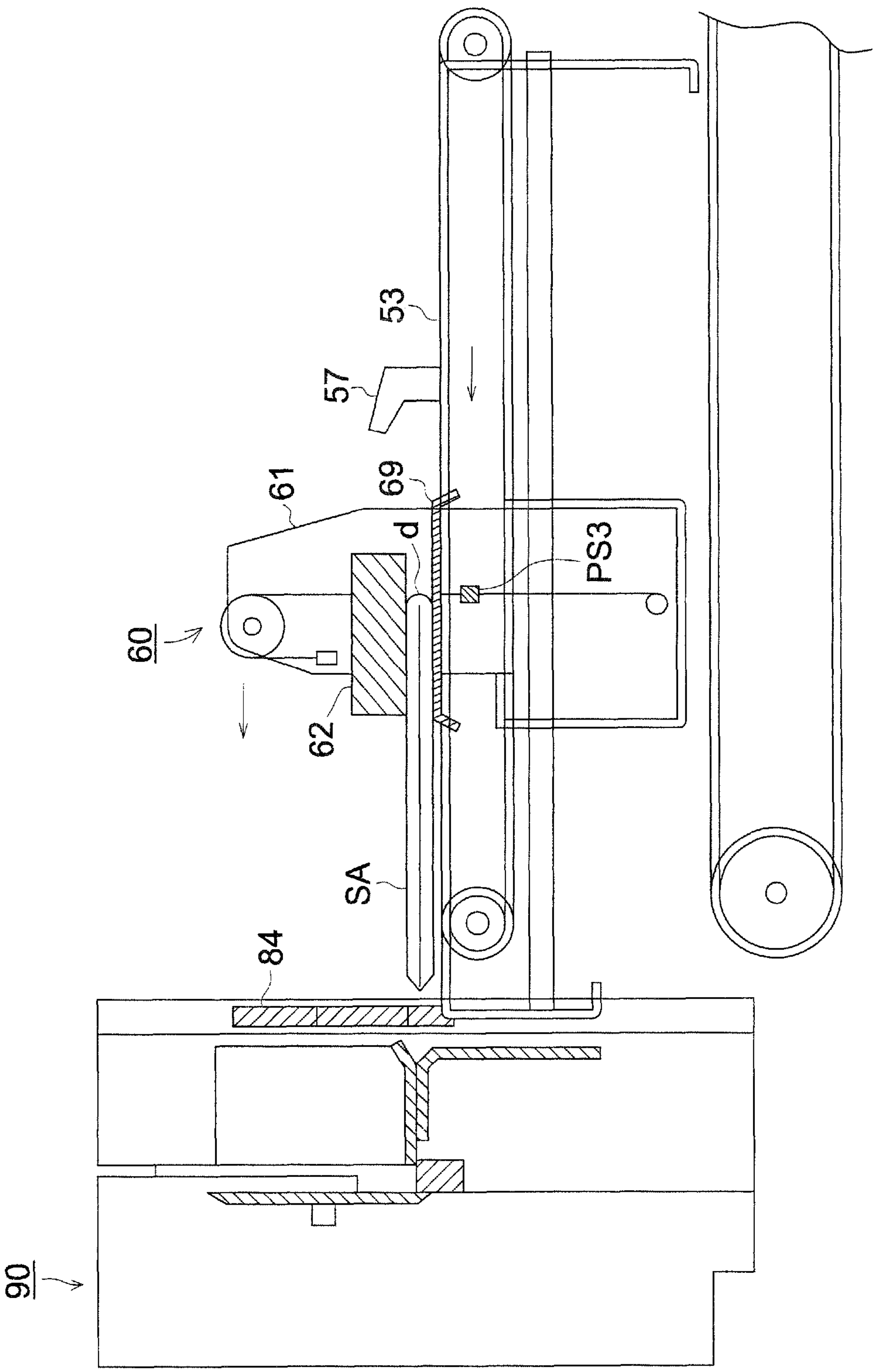
FIG. 15 is a cross-sectional view diagram showing a mechanism that conveys a sheet stack.

(4) By driving the motor M4, the moving member 61 of the sheet stack gripping and conveying section 60 moves from the right in the figure in the direction of the arrow in FIG. 15, and makes a temporary stop when the folding crease d of the sheet stack SA is detected by the sensor PS3 that has been positioned in the sheet stack gripping and conveying section 60.

(5) By driving the motor M3, the pressing member 62 of the sheet stack gripping and conveying section 60 comes down, and presses in the vicinity of the folding crease d of the sheet stack, thereby removing the bulge in the vicinity of the folding crease d and make the sheet stack SA flat (see FIG. 15).

Figure 16:
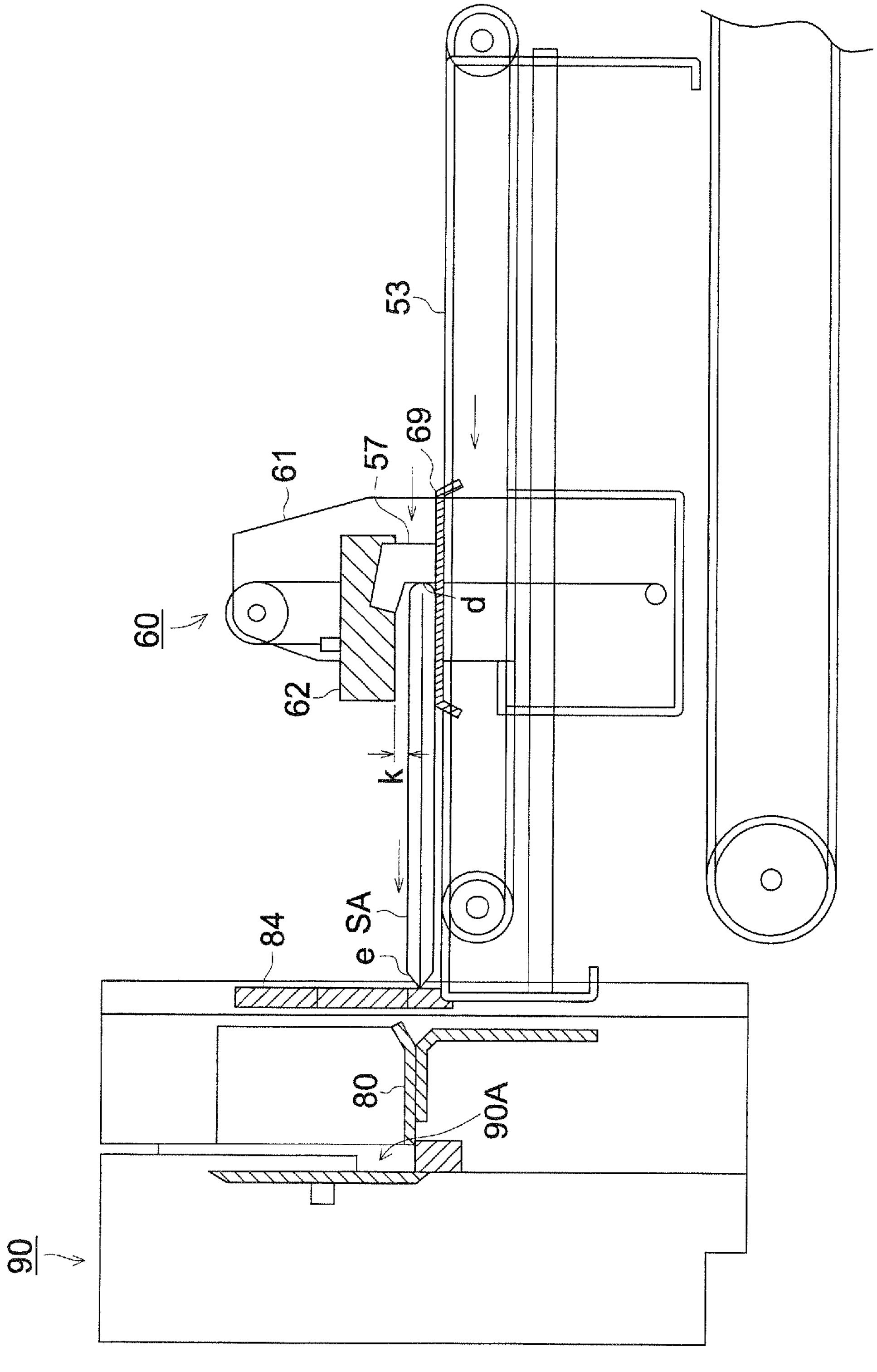
FIG. 16 is a cross-sectional view diagram showing correction of skew in a sheet stack.

(6) By driving the motor M3, the pressing member 62 is raised by a prescribed distance, thereby forming a small gap k between the top surface of the sheet stack SA and the bottom surface of the pressing member 62 (see FIG. 16).

(7) By driving the motor M2, the conveying belt 53 is rotated in the direction of the arrow and moving the pushing member 57 fixed to the conveying belt 53, causing the folding crease d of the sheet stack to butt against it, making the edge e of the sheet stack SA butt against the stopper 84 that has stopped at a lower position by driving the motor M6, thereby correcting any skew of the sheet stack SA. In other words, the edge e and the folding crease d of the sheet stack SA are made respectively parallel to the stopper 84 and the pushing member 57.

Figure 17:
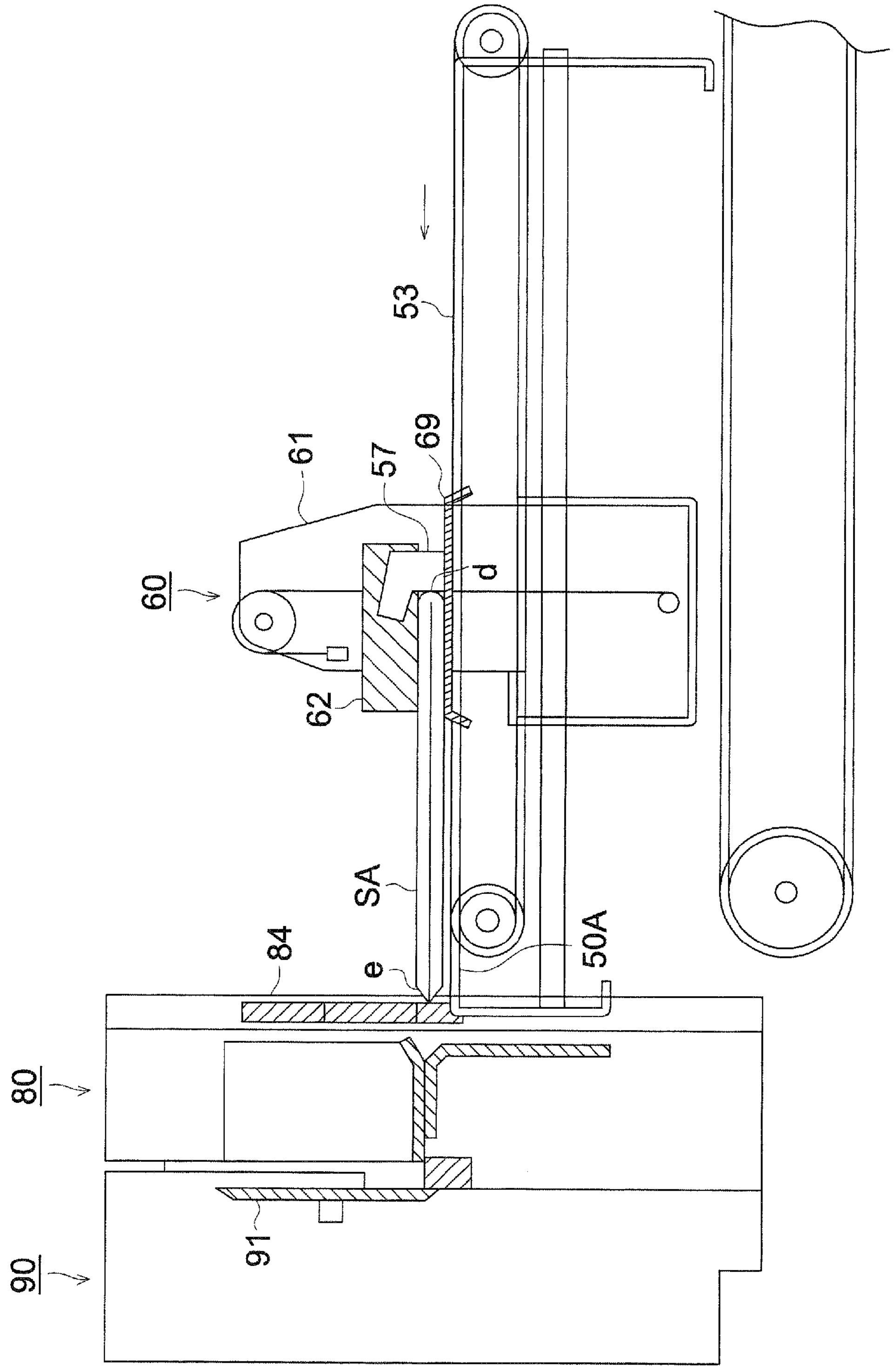
FIG. 17 is a cross-sectional view diagram showing correction of skew in a sheet stack.

(8) After correcting the skew of the sheet stack SA, by driving the motor M3, the pressing member 62 is lowered again, and the sheet stack SA on the supporting plate 69 is gripped by pressing it in the vicinity of the folding crease d (see FIG. 17).

Figure 18:
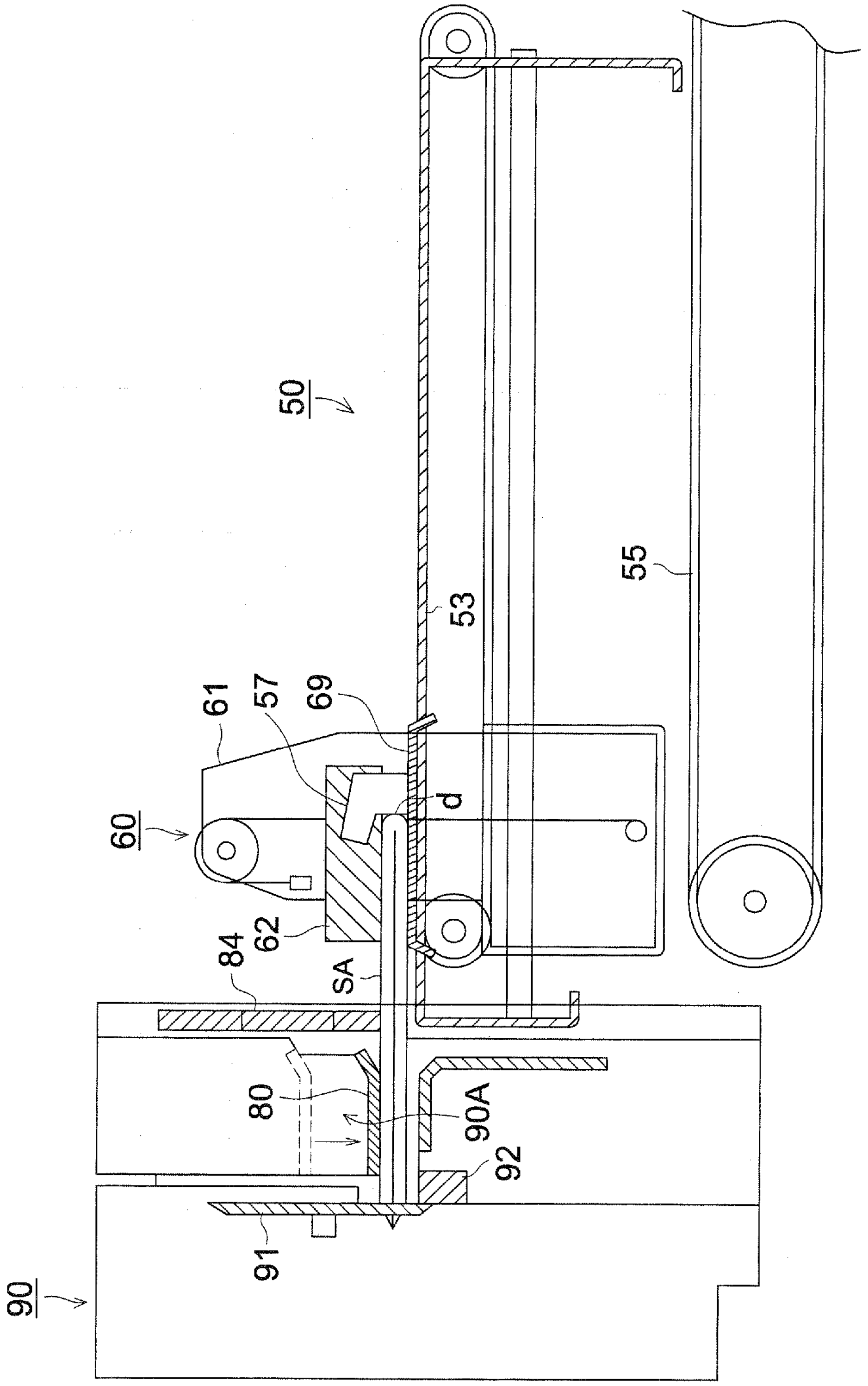
FIG. 18 is a cross-sectional view diagram showing the process of cutting a sheet stack.

(9) By driving the motor M6, the stopper 84 and the edge pressing member 80 are retracted in the upward direction, thereby putting the cutting process opening section 90A in the open state (the position marked by broken lines in FIG. 18).

(10) By moving the sheet stack gripping and conveying section 60 in the left direction in the figure by driving the motor M4, the vicinity of the leading edge of the sheet stack SA passes through the cutting section opening part 90A while moving and being gripped between the pushing member 57 and the supporting plate 69. The sheet stack gripping and conveying section 60 is stopped at a prescribed position according to the sheet size.

(11) By driving the motor M6, the stopper 84 and the edge pressing member 80 are lowered pressing the neighborhood of the edge of the sheet stack SA making it flattened (see FIG. 18).

More detailed explanation is given about the restriction of orientation of the sheet stack described above.

Figure 19:
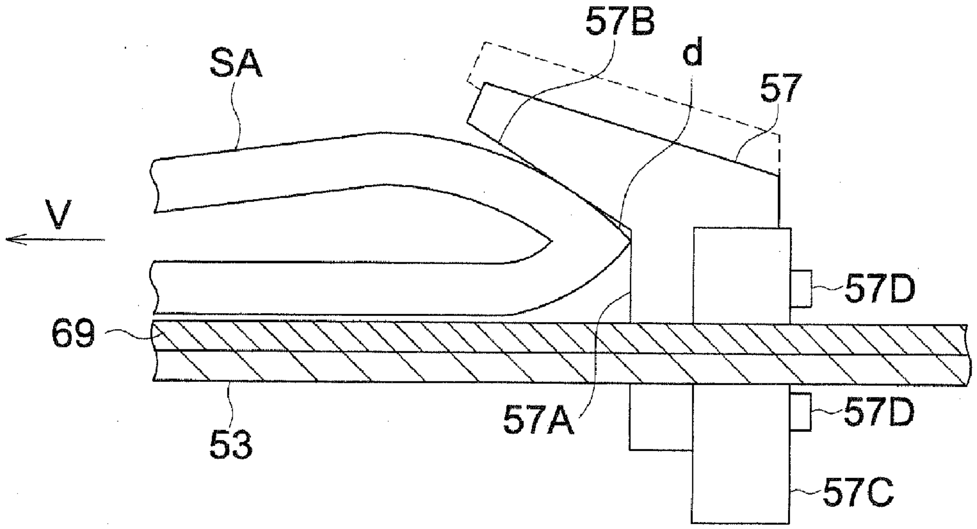
FIG. 19 is a drawing showing a stopping member.

FIG. 19 is a drawing showing a pushing member 57.

The pushing member 57 has a vertical surface 57A (a second surface that is at right angles to the direction movement of the sheet stack SA) that transports the sheet stack SA while pressing its folding crease d and presses the edge e against the stopper 84, and an inclined pressing surface 57B (a first surface that is inclined with respect to the supporting surface of the supporting plate 69) that presses the rear edge of the sheet stack from above which is the thickness direction.

The vertical surface 57A moves the sheet stack SA towards the stopper 84.

Further, when the pushing member 57 presses the sheet stack SA towards the stopper 84, the pressing surface 57B presses the sheet stack SA towards the sheet supporting surface of the supporting plate 69.

Figure 20:
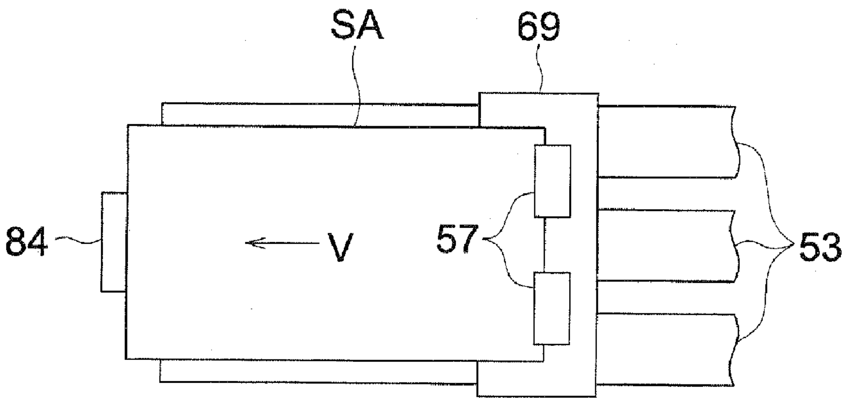
FIG. 20 is a drawing showing the process of correcting the skew in a sheet stack.

A pair of stopping members 57 placed along the transportation width direction eliminates any skew in the sheet stack SA by moving in the direction of the arrow V as is shown in FIG. 20 and making the leading edge of the sheet stack SA butt against the stopper 84.

Although, in the process of conveying the sheet stack SA and placing it on the sheet stack conveying section 50, it is possible that a skew is generated in which the front and rear edges of the sheet stack SA are inclined and not at right angles to the direction of transport, such skew is restricted by the pushing member 57 and the leading edge and the rear edge of the sheet stack SA become perpendicular to the direction of transport.

At the time of restricting the orientation in this manner, the edge part having the folding crease d of the sheet stack SA has its top and bottom positions restricted with respect to the sheet supporting surface of the supporting plate 69 by the pressing surface 57B as shown in FIG. 19. As a result, it is possible to correct any twisting of the sheet stack SA at the time that the pressing member 62 presses the sheet stack SA and eliminates the bulge at the folding crease part.

A pushing member 57X configured so that it presses and moves a sheet stack with only a flat vertical surface is explained with reference to FIG. 21.

Figure 21:
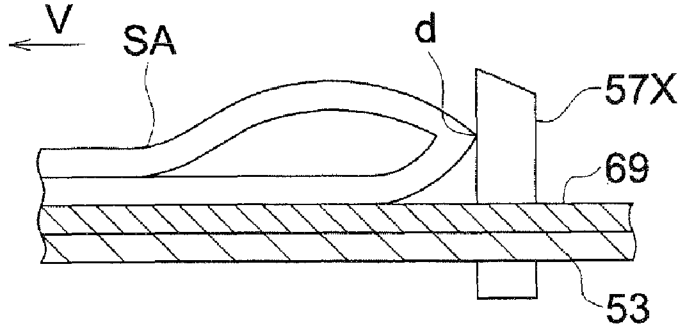
FIGS. 21(*a*) through 21(*d*) are diagrams for explaining the twist of a sheet stack at the time of correcting the skew in a sheet stack.
Figure 21:
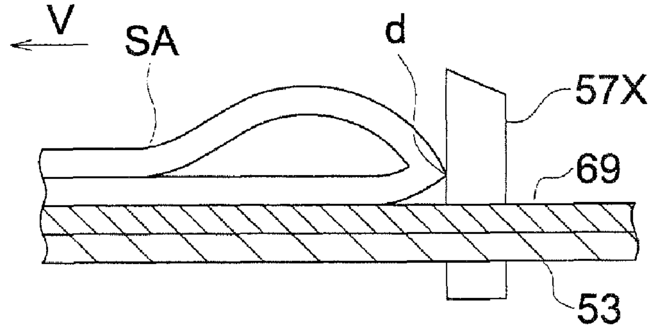
Figure 21:
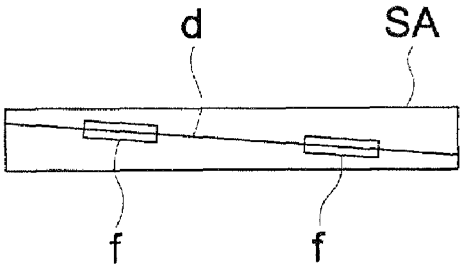
Figure 21:
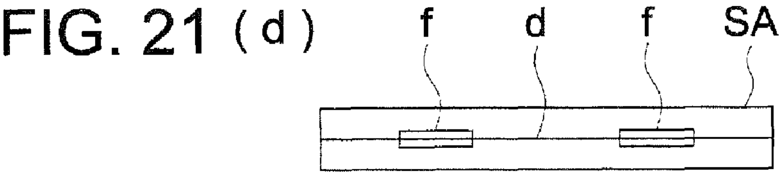

When the pushing member 57X restricts the orientation of the sheet stack SA by moving in the direction of the arrow V shown in FIG. 21, there is no restricting effect in the pushing member 57X regarding the shift in the up or down direction of the folding crease d.

As a result, as is shown in FIG. 21(*a*) and FIG. 21(*b*), the folding crease d of the sheet stack SA may sometimes get shifted in the up or down direction.

Such shifts often occur in cases when the sheets are curled, etc. In other words, in cases when the sheets get curled due to fixing, etc., a shift in the up or down direction occurs in the position of the folding crease d as is shown in FIG. 21(*a*) and FIG. 21(*b*).

If the folding crease d shifts downward in one end part of the sheet stack SA in the transportation width direction (vertical direction), as a reaction, the folding crease d in the other end part shifts upward. In other words, it was confirmed in FIG. 21(*a*) and FIG. 21(*b*) that shifts occur simultaneously in the two end parts along the transportation width direction.

FIG. 21(*c*) is a view of the sheet stack as seen from the folding crease part when the folding crease d has shifted in opposite directions at the two end parts along the transportation width direction. As is shown in the figure, the folding crease part d is inclined and as a result even the stapled parts f and f will have different heights at the left and right. In other words, a twist has occurred in the sheet stack SA.

In the condition in which the sheet stack is twisted, if the sheet stack is cut after shaping it by pressing it using the pressing member 62, when the pressure as released after cutting and the twist is removed, the edge of the sheet stack will not be flat, and the quality of the sheet stack SA becomes low.

As is shown in FIG. 19, because of providing an inclined pressing surface 57B at the pushing member 57, the top and bottom positions of the folding crease d of the sheet stack SA become constant, the shifts in the end parts of the Folding section shown in FIG. 21(*a*), FIG. 21(*b*), and FIG. 21(*c*) disappear, and it is possible to correct twist.

FIG. 21(*d*) shows the end parts of the folding crease of the sheet stack SA when the orientation of the sheet stack is restricted by using a pushing member 57 shown in FIG. 19.

The folding crease part d becomes parallel at the two end surfaces along the width direction of the sheet stack, and even the stapling parts f and f are formed at the center along the thickness direction of the sheet stack.

In this manner, because of pressing and shaping the sheet stack SA without twist by the pressing member 62 and cutting it, it is possible to obtain a sheet stack of a high quality with the edges finished to be flat.

The pushing member 57 is fixed to the conveying belt 53 via the supporting member 57C.

The pushing member 57 and the supporting member 57C are fixed by screws 57D, and it is possible to adjust the height of the pushing member 57 as is shown by the dotted lines.

Further, the configuration is such that the height of the stopping member can be changed according to the thickness of the sheet stack, and it is also possible to make the configuration such that appropriate restricting effect is obtained without being dependent on the thickness of the sheet stack.

Figure 22:
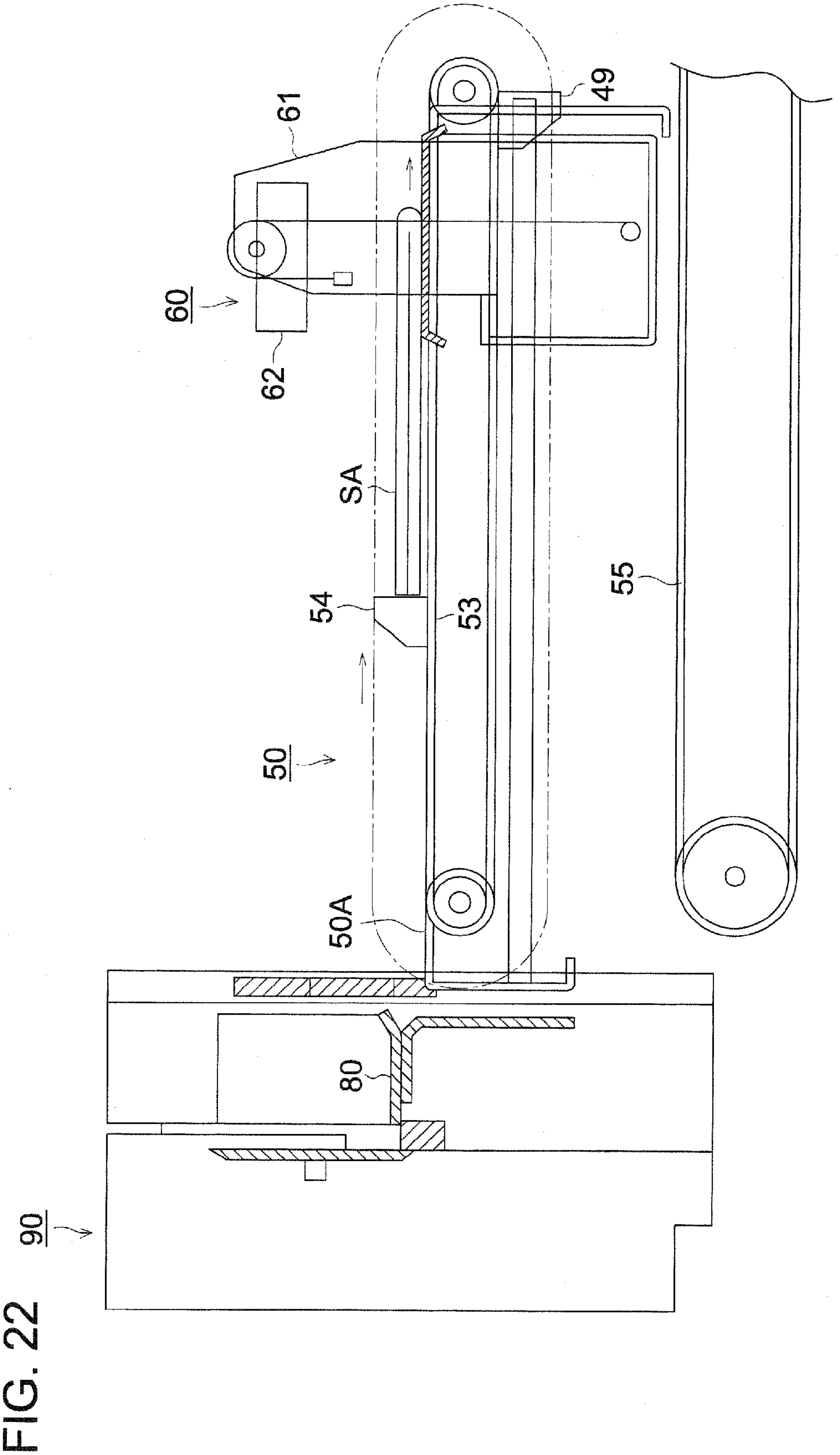
FIG. 22 is a diagram showing the process of conveying a sheet stack after the cutting process.
Figure 23:
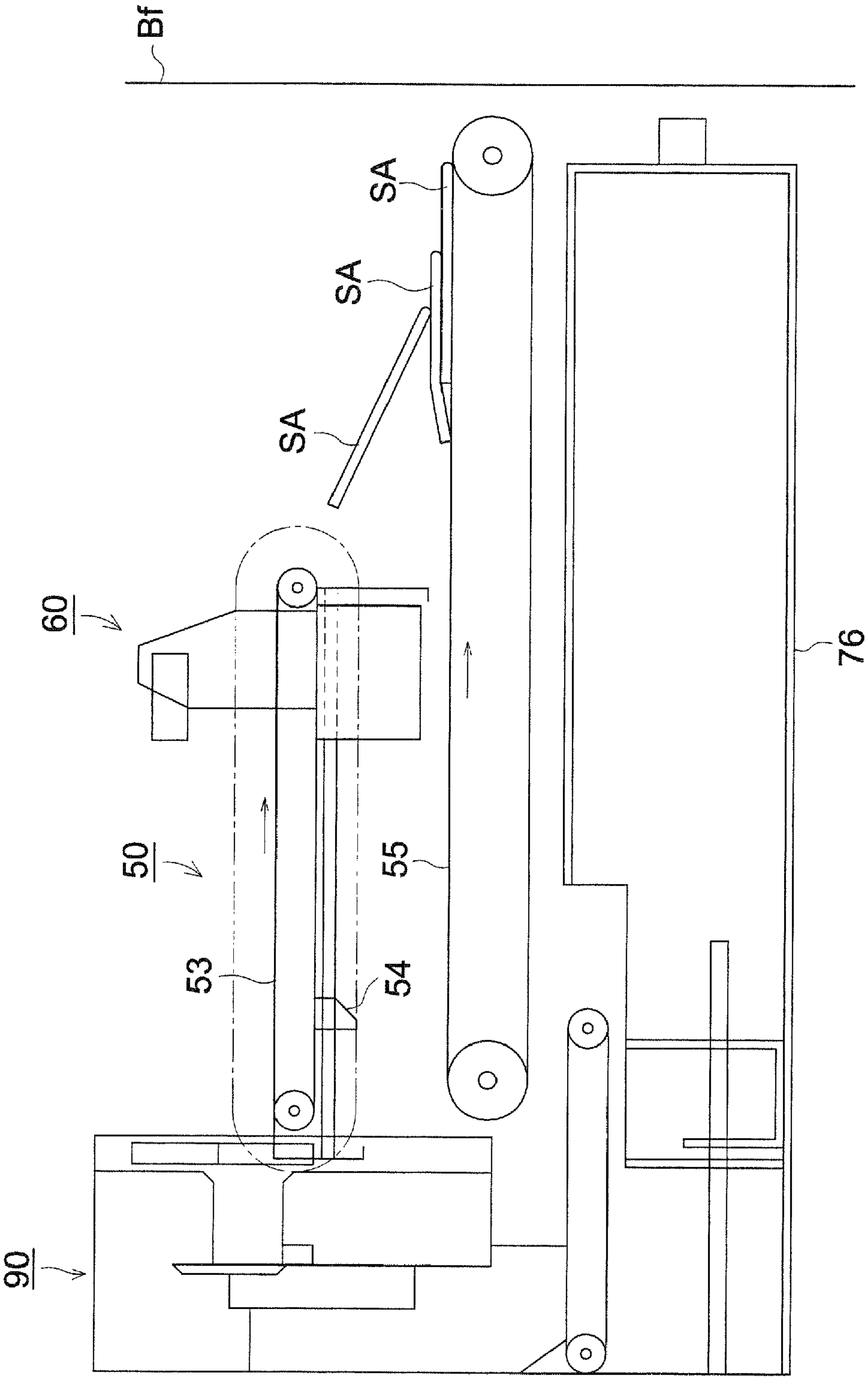
FIG. 23 is a diagram showing the process of discharging a sheet stack.

Cutting Process and Sheet Stack Discharging Process:

FIG. 18 shows the cutting process, and FIG. 22 and FIG. 23 show the process of discharging the sheet stack SA after the cutting process has been completed.

After the sheet stack SA is shaped into the shape of a flat plate by lowering the stopper 84 and the edge pressing member 80 thereby pressing the vicinity of the edge of the sheet stack SA, a rotating upper blade 91 by driving a motor not shown in the figure moves across the width of the stack of sheet with rotating and cuts the edge of the sheet stack in combination with a fixed lower blade 92.

After the cutting process is completed, the pressure of the edge pressing member 80 is released by driving the motor M6, the sheet stack SA is moved towards the right shown in the figure while keeping the pressing member 62 continue to press near the folding crease part 'd' by driving the motor M3.

When the edge e of the sheet stack SA passes above the position of the center of rotation of the drive roller rotating shaft 53A that rotates the conveying belt 53, the pressure of the pressing member 62 is released by driving the motor M3, and, subsequently, by driving the motor M2, the conveying belt 53 is rotated in the forward direction, the movable aligning member 54 fixed to the conveying belt 53 is made to press against the edge e of the sheet stack SA thereby moving it above the sheet stack conveying section frame 50A in the discharging direction (see FIG. 22).

When the edge e of the sheet stack SA passes the swinging position of the movable aligning member 54 near the right end of the transport belt 53 as shown in the figure, the sheet stack SA is pushed by the movable aligning member 54, and drops down from the top of the sheet stack conveying section frame 50A. The dropped sheet stack SA is discharged above the rotating discharge belt 55 and is piled up on the top surface of the previous sheet stack SA (see FIG. 23) in the form of a fish scale structure. The sheet stack SA can be taken out by opening the door at the front Bf of the paper post-processing apparatus B.

Next, a preferred embodiment is explained here that uses as the stopping member one with a shape different from that of the pushing member 57 shown in FIG. 19, etc.

Figure 24:
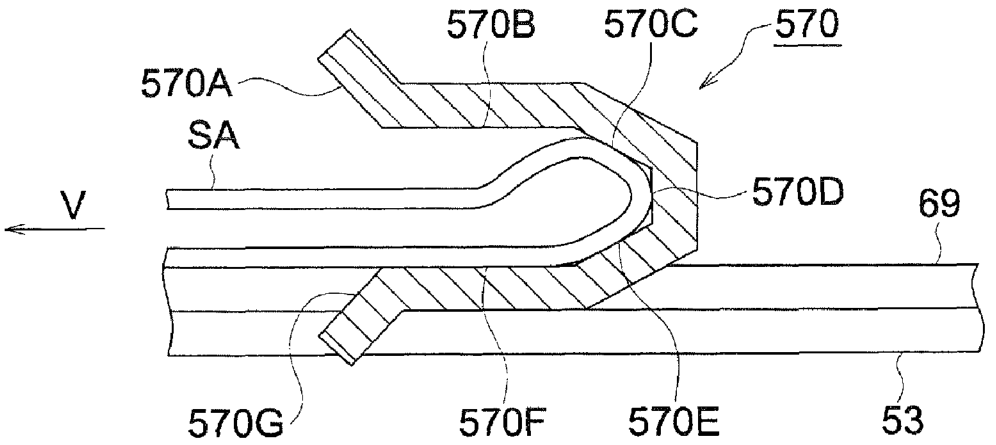
FIGS. 24(*a*) and 24(*b*) are diagrams showing an example of the stopping member.
Figure 24:
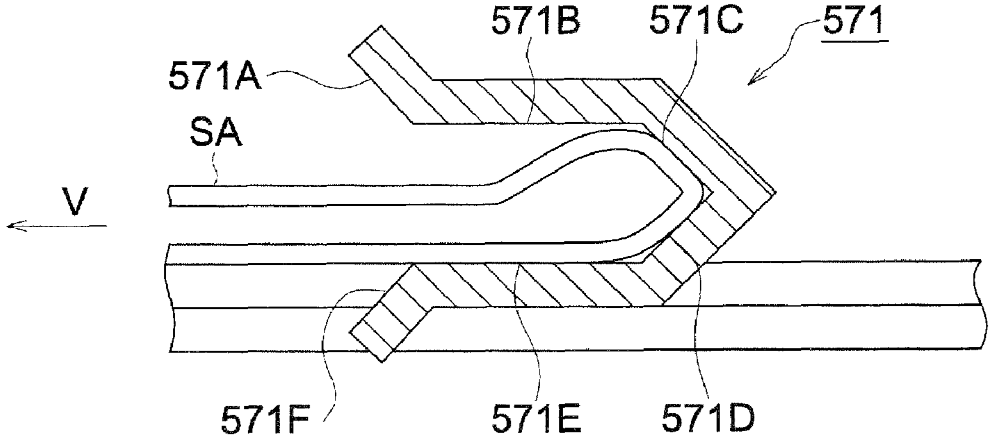

FIG. 24(*a*) shows another example of a stopping member.

The stopping member equivalent to the pushing member 57 in FIG. 19, that is, the pushing member 570 that pushes the sheet stack SA against the stopper 84, has surfaces 570A and 570G that are inclined with respect to the sheet supporting surface of the supporting plate 69, surfaces 570B and 570F that are parallel to said sheet supporting surface, surfaces 570C and 570E that are inclined with respect to the sheet supporting surface of the supporting plate 69, and a surface 570D that is perpendicular to the sheet supporting surface of the supporting plate 69.

As is shown in the figure, the pushing member 570 has the a cup like shape that is open towards the direction of the front of the direction V in which the sheet stack SA is moved by pressing, and the surfaces 570A, 570B, 570F, and 570G act as the guiding surfaces that guide the sheet stack SA to enter into the pushing member.

The surface 570C constitutes a first surface that restricts the height of the folding crease part of the sheet stack SA with respect to the sheet supporting surface of the supporting plate 69.

The surface 570E constitutes a third surface that restricts the height of the folding crease part of the sheet stack SA in a direction opposite to the surface 570C, and is inclined in planar symmetry with the surface 570C relative to the sheet supporting surface of the supporting plate 69.

Because of the surfaces 570C and 570E, the folding crease part of the sheet stack SA is restricted to an almost constant height with respect to the sheet supporting surface of the supporting plate 69.

As a result, as is shown in FIG. 21(*d*), cutting operation is made on a sheet stack SA whose twist has been corrected.

The surface 570D constitutes a second surface that generates the ruling force that moves the sheet stack SA when the pushing member 570 pushes the sheet stack SA by moving in the direction of the arrow V.

FIG. 24(*b*) shows yet another example of a stopping member.

The stopping member equivalent to the pushing member 57 in FIG. 19, that is, the pushing member 571 that pushes the sheet stack SA against the stopper 84, has surfaces 571A and 571F that are inclined with respect to the sheet supporting surface of the supporting plate 69, surfaces 571B and 571E that are parallel to said sheet supporting surface, surfaces 571C and 571D that are inclined with respect to the sheet supporting surface of the supporting plate 69.

As is shown in the figure, the pushing member 571 has the cup like shape that is open towards the direction of the front of the direction V in which the sheet stack SA is moved by pressing, and the surfaces 571A, 571B, 571E, and 570F act as the guiding surfaces that guide the sheet stack SA to enter into the stopping member.

The surface 571C constitutes a first surface that restricts the height of the folding crease part of the sheet stack SA with respect to the sheet supporting surface of the supporting plate 69.

The surface 571D constitutes a third surface that restricts the height of the folding crease part of the sheet stack SA in a direction opposite to the surface 571C, and is inclined in planar symmetry with the surface 571C relative to the sheet supporting surface of the supporting plate 69.

Because of the surfaces 571C and 571D, the folding crease part of the sheet stack SA is restricted to an almost constant height with respect to the sheet supporting surface of the supporting plate 69.

As a result, as is shown in FIG. 21(*d*), cutting operation is made on a sheet stack SA whose twist has been corrected.

The apex part where the surface 571C and the surface 571D intersect each other constitutes a second surface that generates the ruling force that moves the sheet stack SA when the pushing member 571 pushes the sheet stack SA by moving in the direction of the arrow V.

Further, although, in the above preferred embodiments, a sheet processing apparatus B containing center-folding and center-stapling mechanisms and connected to an image forming apparatus A has been described, it is possible to carry out successively multipurpose and multifunction sheet processing by selectively connecting the sheet processing apparatus provided with a sheet folding apparatus according to the present invention to a sheet processing apparatus carrying out center-folding after initially carrying out center-stapling, or to a binding apparatus connected to a light printing machine.

Further, the present invention can also be applied to a sheet processing apparatus that is used after connecting to a light printing machine, a printer, a facsimile machine, a multifunction peripheral, or any other image forming apparatus.

In addition, it is also possible to realize various types of folding processes as a sheet processing apparatus in the standalone mode separated from an image forming apparatus.

What is claimed is:

1. A sheet processing apparatus comprising:

a sheet supporting table which supports a sheet stack made of a plurality of sheets which have been folded;

a stopper against which a first edge of the sheet stack on the sheet supporting table is pressed, wherein the first edge is located at a side of the sheet stack to be cut; and a pushing member which is movable in a direction towards the stopper to push a second edge of the sheet stack located at a folded side of the sheet stack so that the first edge of the sheet stack is pressed against the stopper, wherein the pushing member comprises a first surface which is inclined with respect to a sheet supporting surface of the sheet supporting table so that the first surface restricts a height of the folded part of the sheet stack with respect to the sheet supporting surface when the pushing member presses the sheet stack towards the stopper, and wherein a height between the first surface and the supporting surface is changeable.

2. The sheet processing apparatus according to claim 1, wherein the pushing member further comprises a second surface for moving the sheet stack towards the stopper.

3. The sheet processing apparatus according to claim 2, wherein the pushing member further comprises a third surface that is inclined with respect to the sheet supporting surface of the sheet supporting table so that the third surface restricts the height of the folded part of the sheet stack with respect to the sheet supporting surface in an opposite direction toward which the first surface restricts.

4. The sheet processing apparatus according to claim 1, wherein the pushing member further comprises a third surface that is inclined with respect to the sheet supporting surface of the sheet supporting table so that the third surface restricts the height of the folded part of the sheet stack with respect to the sheet supporting surface in an opposite direction toward which the first surface restricts.

5. The sheet processing apparatus according to claim 1, further comprising a stapling section which staples the plurality of sheets, wherein the sheet stack supported on the sheet supporting table comprises a booklet which has been stapled by the stapling section.

6. The sheet processing apparatus according to claim 1, wherein the height between the first surface and the supporting surface is changeable corresponding to a thickness of the sheet stack.

7. The sheet processing apparatus according to claim 1, further comprising a cutting section for cutting the sheet stack, wherein the cutting section cuts the sheet stack after a posture of the sheet stack is restricted by the pushing member pressing the sheet stack against the stopper.

8. The sheet processing apparatus according to claim 1, further comprising a folding section which folds the plurality of sheets and a stapling section which staples the plurality of sheets.

9. An image forming system comprising:

an image forming apparatus which forms an image onto a sheet; and the sheet processing apparatus according to claim 1 which performs a finishing process to the sheet onto which the image has been formed by the image forming apparatus.

* * * * *